United States Patent
Fong et al.

(10) Patent No.: US 11,664,938 B2
(45) Date of Patent: May 30, 2023

(54) DELIVERING CONFIGURED GRANTS TO SIDELINK RECEIVERS WITH CONFIRMATION

(71) Applicant: QUALCOMM Incorporated, San Diego, CA (US)

(72) Inventors: Lik Hang Silas Fong, Bridgewater, NJ (US); Piyush Gupta, Bridgewater, NJ (US); Jing Sun, San Diego, CA (US); Junyi Li, Fairless Hills, PA (US); Xiaoxia Zhang, San Diego, CA (US); Xiaojie Wang, Hillsborough, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 35 days.

(21) Appl. No.: 17/338,192

(22) Filed: Jun. 3, 2021

(65) Prior Publication Data
US 2022/0006576 A1    Jan. 6, 2022

Related U.S. Application Data

(60) Provisional application No. 63/048,278, filed on Jul. 6, 2020.

(51) Int. Cl.
  H04L 1/1867   (2023.01)
  H04W 92/18   (2009.01)
  H04W 72/23   (2023.01)

(52) U.S. Cl.
  CPC .......... *H04L 1/1896* (2013.01); *H04W 72/23* (2023.01); *H04W 92/18* (2013.01)

(58) Field of Classification Search
  None
  See application file for complete search history.

(56) References Cited

U.S. PATENT DOCUMENTS

| | | | |
|---|---|---|---|
| 11,398,883 B2* | 7/2022 | Ganesan | H04L 1/1896 |
| 2020/0029318 A1* | 1/2020 | Guo | H04W 72/042 |
| 2022/0217690 A1* | 7/2022 | Liu | H04W 4/70 |

* cited by examiner

*Primary Examiner* — Hong S Cho
(74) *Attorney, Agent, or Firm* — Holland & Hart LLP

(57) ABSTRACT

Methods, systems, and devices for wireless communications are described. A first user equipment (UE) may receive, from a base station associated with the first UE and a second UE, a downlink control information activating a set of configured grant resources for transmissions from the second UE to the first UE. The UE may transmit, according to the downlink control information, a feedback message to the base station confirming receipt of the downlink control information.

30 Claims, 17 Drawing Sheets

DELIVERING CONFIGURED GRANTS TO SIDELINK RECEIVERS WITH CONFIRMATION

CROSS REFERENCE

The present Application for Patent claims the benefit of U.S. Provisional Patent Application No. 63/048,278 by Fong et al., entitled "DELIVERING CONFIGURED GRANTS TO SIDELINK RECEIVERS WITH CONFIRMATION," filed Jul. 6, 2020, assigned to the assignee hereof, and expressly incorporated by reference herein.

FIELD OF TECHNOLOGY

The following relates generally to wireless communications and more specifically to delivering configured grants to sidelink receivers with confirmation.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support delivering configured grants to sidelink receivers with confirmation. Generally, the described techniques provide a mechanism for a base station to activate/deactivate configured resources (e.g., a set of configured grant resources) for sidelink transmissions using a downlink control information (DCI) message with medium access control (MAC) control element (CE) confirmation for sidelink receptions. For example, the base station may be associated with a first user equipment (UE) (the receive mode UE) and a second UE (the transmit mode UE) that are performing sidelink communications with each other. Typically, the base station may transmit the DCI message to the transmitting UE (e.g., the second UE) activating/deactivating configured grant resources for the sidelink transmissions. However, this means the receiving UE (e.g., the first UE) attempts to monitor and decode all subchannels that are preconfigured for sidelink transmissions to detect and decode its own sidelink transmission from the second UE, which may include multiple subchannels (e.g., 20 subchannels). This approach may be costly for the first UE in terms of battery usage, processing requirements, time delays, and the like. Accordingly, aspects of the described techniques provide for the base station to transmit the DCI message(s) activating/deactivating configured grant resources (e.g., the set of configured grant resources) for transmissions from the second UE to the first UE to both the first UE and the second UE. Accordingly, the first UE may only need to decode the configured grant resources indicated in the DCI for reception of the transmissions from the second UE. The second UE may perform the transmissions to the first UE according to the DCI (e.g., using the activated configured grant resources). The first UE may then transmit or otherwise convey a feedback message (e.g., a MAC CE confirmation or a separate indication) to the base station indicating positive or negative acknowledgment information for the DCI message and/or for the reception of the sidelink transmissions from the second UE.

A method of wireless communication at a first UE is described. The method may include receiving, from a base station associated with the first UE and a second UE, a DCI activating a set of configured grant resources for transmissions from the second UE to the first UE, and transmitting, according to the DCI, a feedback message to the base station confirming receipt of the DCI.

An apparatus for wireless communication at a first UE is described. The apparatus may include a processor, memory coupled with the processor, and instructions stored in the memory. The instructions may be executable by the processor to cause the apparatus to receive, from a base station associated with the first UE and a second UE, a DCI activating a set of configured grant resources for transmissions from the second UE to the first UE, and transmit, according to the DCI, a feedback message to the base station confirming receipt of the DCI.

Another apparatus for wireless communication at a first UE is described. The apparatus may include means for receiving, from a base station associated with the first UE and a second UE, a DCI activating a set of configured grant resources for transmissions from the second UE to the first UE, and transmitting, according to the DCI, a feedback message to the base station confirming receipt of the DCI.

A non-transitory computer-readable medium storing code for wireless communication at a first UE is described. The code may include instructions executable by a processor to receive, from a base station associated with the first UE and a second UE, a DCI activating a set of configured grant resources for transmissions from the second UE to the first UE, and transmit, according to the DCI, a feedback message to the base station confirming receipt of the DCI.

Some examples of the method, apparatuses, and non-transitory computer-readable medium described herein where the DCI identifies a second feedback resource for a second feedback message associated with the transmissions from the second UE and may further include operations, features, means, or instructions for receiving the transmissions from the second UE according to the DCI, and transmitting the second feedback message to the base station confirming receipt of the transmissions from the second UE.

Some examples of the method, apparatuses, and non-transitory computer-readable medium described herein may further include operations, features, means, or instructions for determining, based on a field in the DCI, that the DCI includes a reception mode DCI activating the set of resources for reception of the transmissions from the second UE.

Some examples of the method, apparatuses, and non-transitory computer-readable medium described herein may further include operations, features, means, or instructions for determining, based on an destination identifier used to scramble at least a portion of the DCI, that the DCI includes a reception mode DCI activating the set of resources for reception of the transmissions from the second UE.

Some examples of the method, apparatuses, and non-transitory computer-readable medium described herein may further include operations, features, means, or instructions for determining, based on a format associated with the DCI, that the DCI includes a reception mode DCI activating the set of resources for reception of the transmissions from the second UE.

In some examples of the method, apparatuses, and non-transitory computer-readable medium described herein, the format associated with the DCI indicates at least a time gap, a lowest index for a subchannel allocation for the transmissions, a frequency resource allocation, a time resource allocation, a configuration index, an uplink control channel resource indicator, or a combination thereof.

Some examples of the method, apparatuses, and non-transitory computer-readable medium described herein may further include operations, features, means, or instructions for identifying a first portion of a subheader of the feedback message associated with the first UE and a second portion of the subheader of the feedback message associated with the second UE, and configuring the first portion of the subheader of the feedback message to confirm receipt of the DCI, the transmissions from the second UE, or a combination thereof.

Some examples of the method, apparatuses, and non-transitory computer-readable medium described herein may further include operations, features, means, or instructions for receiving, from the base station, a configuration signal identifying the first portion and the second portion of the subheader.

Some examples of the method, apparatuses, and non-transitory computer-readable medium described herein may further include operations, features, means, or instructions for selecting a feedback message format associated with the DCI activating the set of resources for transmissions from the second UE to the first UE, and configuring the feedback message to confirm receipt of the DCI, the transmissions from the second UE, or a combination thereof, based on the feedback message.

Some examples of the method, apparatuses, and non-transitory computer-readable medium described herein may further include operations, features, means, or instructions for determining that the DCI from the base station was successfully decoded by the first UE, determining that the transmissions from the second UE were unable to be successfully decoded by the first UE, and configuring the feedback message with a positive or negative acknowledgement indication for the transmissions from the second UE, which conveys an acknowledgement indication for the DCI.

A method of wireless communication at a base station is described. The method may include determining that a second UE is to perform transmissions to a first UE, transmitting, to at least the first UE, a DCI activating a set of configured grant resources for transmissions from the second UE to the first UE, and receiving, from the first UE and according to the DCI, a feedback message confirming receipt of the DCI.

An apparatus for wireless communication at a base station is described. The apparatus may include a processor, memory coupled with the processor, and instructions stored in the memory. The instructions may be executable by the processor to cause the apparatus to determine that a second UE is to perform transmissions to a first UE, transmit, to at least the first UE, a DCI activating a set of configured grant resources for transmissions from the second UE to the first UE, and receive, from the first UE and according to the DCI, a feedback message confirming receipt of the DCI.

Another apparatus for wireless communication at a base station is described. The apparatus may include means for determining that a second UE is to perform transmissions to a first UE, transmitting, to at least the first UE, a DCI activating a set of configured grant resources for transmissions from the second UE to the first UE, and receiving, from the first UE and according to the DCI, a feedback message confirming receipt of the DCI.

A non-transitory computer-readable medium storing code for wireless communication at a base station is described. The code may include instructions executable by a processor to determine that a second UE is to perform transmissions to a first UE, transmit, to at least the first UE, a DCI activating a set of configured grant resources for transmissions from the second UE to the first UE, and receive, from the first UE and according to the DCI, a feedback message confirming receipt of the DCI.

Some examples of the method, apparatuses, and non-transitory computer-readable medium described herein where the DCI identifies a second feedback resource for a second feedback message associated with the transmissions form the second UE and may further include operations, features, means, or instructions for receiving, from the first UE and according to the DCI, the second feedback message confirming receipt of the transmissions from the second UE.

Some examples of the method, apparatuses, and non-transitory computer-readable medium described herein may further include operations, features, means, or instructions for configuring a field in the DCI to indicate that the DCI includes a reception mode DCI activating the set of resources for reception of the transmissions from the second UE.

Some examples of the method, apparatuses, and non-transitory computer-readable medium described herein may further include operations, features, means, or instructions for selecting a destination identifier used to scramble at least a portion of the DCI to indicate that the DCI includes a reception mode DCI activating the set of resources for reception of the transmissions from the second UE.

Some examples of the method, apparatuses, and non-transitory computer-readable medium described herein may further include operations, features, means, or instructions for selecting a format associated with the DCI to indicate that the DCI includes a reception mode DCI activating the set of resources for reception of the transmissions from the second UE.

In some examples of the method, apparatuses, and non-transitory computer-readable medium described herein, the format associated with the DCI indicates at least a time gap, a lowest index for a subchannel allocation for the transmissions, a frequency resource allocation, a time resource allocation, a configuration index, an uplink control channel resource indicator, or a combination thereof.

Some examples of the method, apparatuses, and non-transitory computer-readable medium described herein may further include operations, features, means, or instructions for determining, based on a first portion of a subheader of the feedback message associated with the first UE and a second portion of the subheader of the feedback message associated with the second UE, that the first portion of the feedback message confirms receipt of the DCI, the transmissions from the second UE, or a combination thereof.

Some examples of the method, apparatuses, and non-transitory computer-readable medium described herein may further include operations, features, means, or instructions for receiving, from the base station, a configuration signal identifying the first portion and the second portion of the subheader.

Some examples of the method, apparatuses, and non-transitory computer-readable medium described herein may further include operations, features, means, or instructions for determining that the feedback message includes a feedback message format associated with the DCI activating the set of resources for transmissions from the second UE to the first UE, and decoding the feedback message to confirm receipt of the DCI, the transmissions from the second UE, or a combination thereof, based on the feedback message format.

Some examples of the method, apparatuses, and non-transitory computer-readable medium described herein may further include operations, features, means, or instructions for determining that the feedback message includes a positive or negative acknowledgement indication for the transmissions from the second UE, which conveys an acknowledgement indication for the DCI.

DETAILED DESCRIPTION

In some wireless communication systems, a user equipment (UE) may perform wireless communications with other UE over a sidelink channel, e.g., a physical sidelink control channel (PSCCH) and/or a physical sidelink shared channel (PSSCH). In some examples, the sidelink communications may be autonomously scheduled/performed by the UE. In other examples, the sidelink communications between the UE may be scheduled by a base station. For example, the base station may transmit a downlink control information (DCI) message to the transmitting UE identifying resources for the sidelink transmissions. The receiving UE (e.g., a first UE in this example) may attempt to monitor and decode subchannels that are preconfigured for sidelink transmissions to detect and decode its own sidelink transmission from the other UE (e.g., the second UE in this example), which may include multiple subchannels (e.g., 20 subchannels). This approach may be costly for the first UE in terms of battery usage, processing requirements, time delays, and the like.

Aspects of the disclosure are initially described in the context of wireless communications systems. Generally, the described techniques provide a mechanism for a base station to activate/deactivate configured grant resources (e.g., a set of configured grant resources) for sidelink transmissions using a DCI message with medium access control (MAC) control element (CE) confirmation for sidelink receptions. For example, the base station may be associated with a first UE and/or a second UE that are performing sidelink communications with each other. The base station may transmit or otherwise convey the DCI message(s) activating/deactivating configured grant resources (e.g., the set of configured grant resources) for transmissions from the second UE to the first UE to both the first UE and the second UE. The second UE may then perform the sidelink transmissions to the first UE using the resources activated in the DCI message(s). Accordingly, the first UE may only need to decode the configured grant resources indicated in the DCI message for reception of the transmissions from the second UE. The first UE may then transmit or otherwise convey a feedback message (e.g., the MAC CE confirmation) to the base station, directly or indirectly via the second UE, indicating positive or negative acknowledgment information for the DCI message and/or the sidelink transmissions from the second UE.

Aspects of the disclosure are further illustrated by and described with reference to apparatus diagrams, system diagrams, and flowcharts that relate to delivering configured grants to sidelink receivers with confirmation.

Figure 1:
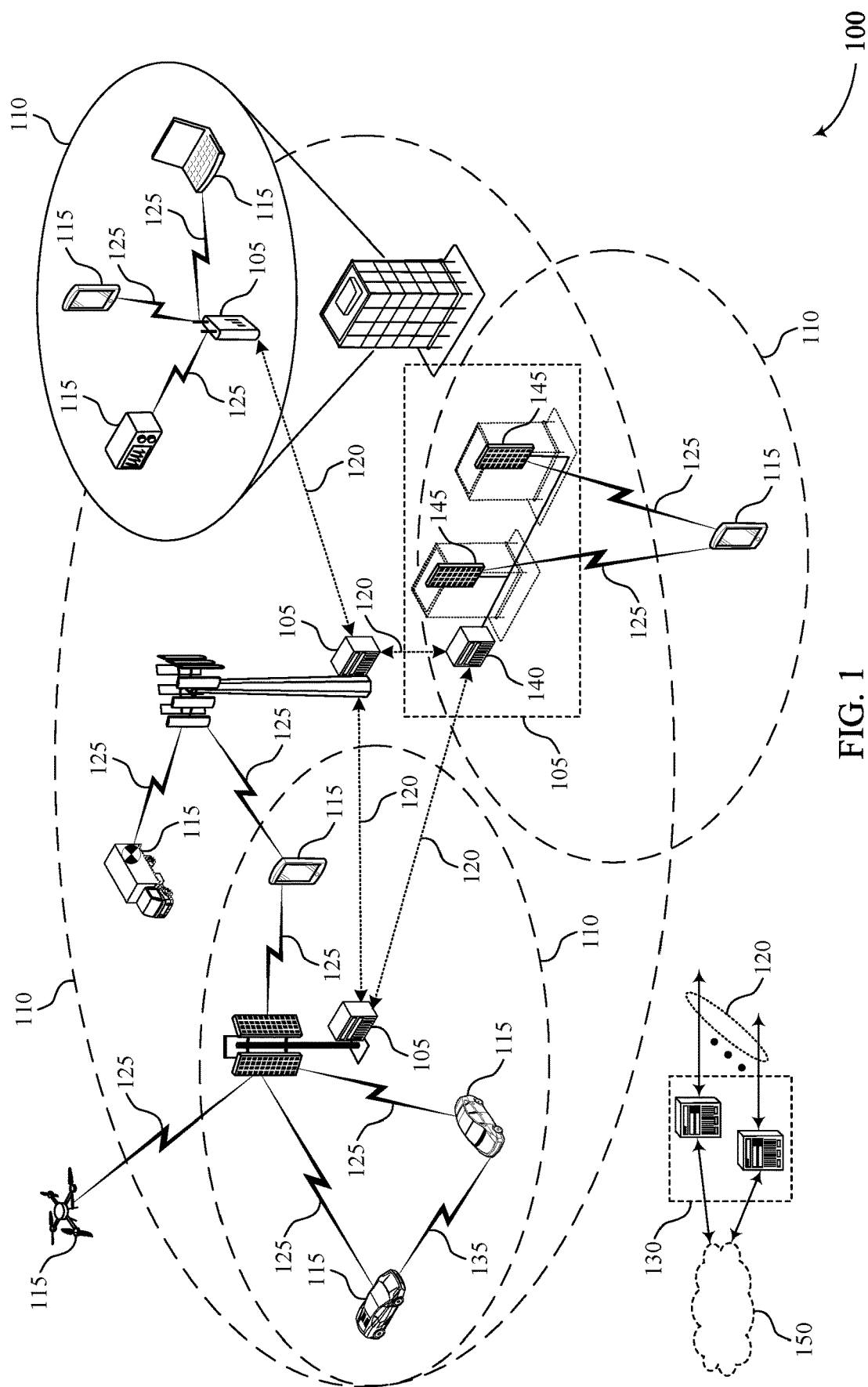
FIG. 1 illustrates an example of a system for wireless communications that supports delivering configured grants to sidelink receivers with confirmation in accordance with aspects of the present disclosure.

FIG. 1 illustrates an example of a wireless communications system 100 that supports delivering configured grants to sidelink receivers with confirmation in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 (e.g., a first UE) may receive, from a base station 105 associated with the first UE and a second UE, a DCI activating a set of configured grant resources for transmissions from the second UE to the first UE. The UE 115 may transmit, according to the DCI, a feedback message to the base station 105 confirming receipt of the DCI.

A base station 105 may determine that a second UE is to perform transmissions to a first UE. The base station 105 may transmit, to at least the first UE, a DCI activating a set of configured grant resources for transmissions from the second UE to the first UE. The base station 105 may receive, from the first UE and according to the DCI, a feedback message confirming receipt of the DCI.

Figure 2:
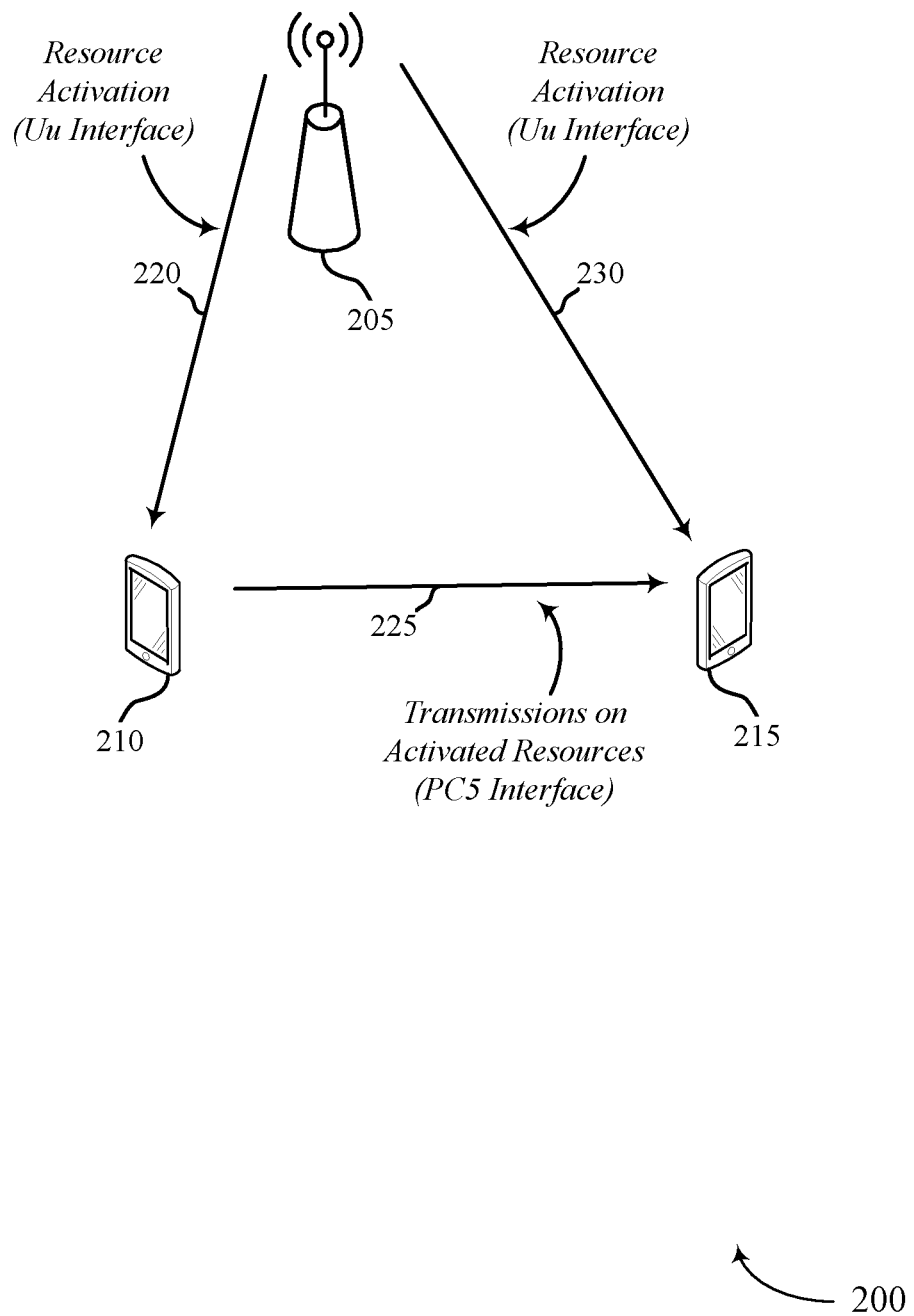
FIG. 2 illustrates an example of a wireless communication system that supports delivering configured grants to sidelink receivers with confirmation in accordance with aspects of the present disclosure.

FIG. 2 illustrates an example of a wireless communication system 200 that supports delivering configured grants to sidelink receivers with confirmation in accordance with aspects of the present disclosure. In some examples, wireless communication system 200 may implement aspects of wireless communication system 100. Wireless communication system 200 may include base station 205, UE 210, and UE 215, which may be examples of corresponding devices described herein. In some aspects, UE 215 may be an example of a first UE or receive mode UE and UE 210 may be an example of a second UE or transmit mode UE.

Wireless communication system 200 may support various traffic types. One non-limiting example may include mission critical traffic, such as may be communicated in factory automation settings. Broadly, such mission critical traffic may be deterministic and periodic in nature. For example and within the factory automation setting, such traffic may include cyclic exchanges between a programmable logic controller (PLC), which may be an example of a base station 205 in this example, and one or more sensors/actuators (S/A), which may be examples of UE 210 and UE 215 in this example. In other examples, base station 205 may be an example of a cellular base station (e.g., gNB), UE 210 may be an example of a PLC, and UE 215 may be an example of a S/A. The traffic type may include a small application-layer payload of approximately 40 to 256 bytes, e.g., to minimize overhead associated with various headers. Such traffic may have stringent latency and reliability requirements, e.g., latency requirements of approximately 1-2 ms and reliability requirements of approximately $10^{-6}$. Both data and control channels may be designed to satisfy such latency and reliability requirements. Moreover, deployment density in such factory automation settings may be large, e.g., approximately 20 to 50 S/A per PLC, with some facilities having 100 to 1000 PLCs, or more.

Making communications between the PLCs and S/As wireless reduces reconfiguration and/or deployment costs within the factory setting. For example, PLCs may be located close to the machinery in which the S/A are located. The PLCs, which may be an example of base station 205 and/or UE 210 in this example, may communicate with a gNB that is ceiling-mounted. In this configuration, the PLCs may communicate with the gNB using a Uu interface (e.g., a cellular-based wireless interface) and communicate with the S/As using a PC5 interface (e.g., a sidelink-based wireless interface). However, it is to be understood that the described techniques are not limited to the factory automation setting, but may, instead, be implemented between gNB/base stations and UEs communicating wirelessly within a more typical cellular deployment, in a V2X deployment, and the like.

The PC5 interface is typically utilized in a V2X wireless network where base station 205 schedules or otherwise allocates sidelink resources to be used by UE 210 and UE 215 for sidelink transmissions. For example, dynamic grants (DG), configured grant (CG) type 1, and CG type 2 resource allocations may be supported, any of which may be considered a set of configured grant resources in accordance with aspects of the described techniques. Resources associated with CG type 1 may be activated via RRC signaling from base station 205. DG and CG type 2 resources may be activated using a DCI message transmitted over a PDCCH (e.g., a DCI 3_0 message). The DCI message may schedule or otherwise allocate DG resources for use for sidelink transmissions. The DCI message may activate/deactivate the CG type 2 resources for sidelink transmissions. As discussed, the DCI message is typically transmitted to the transmitting UE, which is the second UE in this example corresponding to UE 210. UE 210 may confirm activation/deactivation of the resources using a MAC CE. In some examples, UE 210 may transmit or otherwise report its sidelink buffer status report (BSR) to base station 205 using a MAC CE.

Accordingly, in some wireless communication systems base station 205 may use a DCI message to deliver a CG type 2 grant of resources to the transmitting UE (e.g., UE 210), with the transmitting UE confirming activation of the resources in a MAC CE. The transmitting UE (e.g., UE 210) may use a sidelink control information (SCI) 0-1 and SCI 0-2 to schedule PSSCH and transmit data through PSSCH according to the CG type 2 (e.g., using the activated resources). The receiving UE (e.g., UE 215 in this example) transmits ACK/NACK on a physical sidelink feedback channel (PSFCH) upon receiving each transmission from UE 210 according to CG type 2, with the transmitting UE (e.g., UE 210) forwarding the ACK/NACK indication to base station 205 on PUCCH and/or PUSCH. Accordingly, base station 205 may detect a CG loss and retransmit the CG (e.g., to the DCI) to the transmitting UE based on a discontinuous transmission (DTX) on PUCCH (which base station 205 detects after the CG transmission starts) and/or based on base station 205 detecting a lack of MAC CE confirmation on PUSCH from UE 210.

As discussed, the MAC CE confirmation from UE 210 (e.g., the transmitting UE in this example) may be identified by an 8 bit MAC CE subheader with a logical channel ID (LCID) of 40, e.g., LCID=40. That is, the MAC CE may include an eight bit octet using bits $C_1$-$C_7$. The $C_i$ bit (or field) may be set to "1" to confirm that the CG with sidelink configuration index CG i (e.g., sl-ConfigIndexCG i) is activated and set to "0" to indicate that the CG with sidelink configuration index CG i is deactivated, or vice versa.

Accordingly, the PC5 interface may include base station 205 transmitting a DCI message (e.g., DCI format 3_0) to UE 210 (e.g., the transmitting UE) to activate or deactivate configured grant resources (e.g., a set of configured grant resources) for sidelink transmissions. Base station 205 may activate or deactivate CG resources for a specific sidelink channel/transmission, e.g., resources for one or more particular subchannels. However, this approach typically means that the receiving UE (e.g., UE 215 in this example) may attempt to decode all subchannels that are preconfigured for sidelink transmissions in order to detect and decode its own sidelink transmission from the transmitting UE (e.g., UE 210). As multiple subchannels may be configured for sidelink transmissions, this may mean that the receiving UE must attempt to decode each subchannel in order to determine whether the transmitting UE is performing a sidelink transmission to UE 215.

However, aspects of the described techniques may provide a mechanism for base station 205 to activate/deactivate configured grant resources in the DCI message with MAC CE confirmation for sidelink receptions. Accordingly, a sidelink receiver (e.g., UE 215 in this example) with a limited capability may need to monitor the sidelink subchannel(s) as indicated in the DCI message rather than monitoring all subchannels. This reduction in resource monitoring may be significant for the receiving UE (e.g., from 20 subchannels to one subchannel) when base station 205 assigned specific subchannel resources for the sidelink transmission.

Accordingly, base station 205 may identify or otherwise determine that the transmitting UE (e.g., the second UE in this example, which may correspond to UE 210) is to perform transmissions, such as sidelink transmissions, to a receiving UE (e.g., the first UE in this example, which may correspond to UE 215). For example, base station 205 may receive an indication of the BSR of UE 210 indicating that it has information to communicate to UE 215. Base station 205 may then transmit or otherwise convey an indication of a DCI to UE 210 as well as to UE 215 (e.g., the receiving UE in this example) activating a set of resources (e.g., sidelink resources, which may be on a per-subchannel basis in some examples) for transmissions from UE 210 to UE 215. That is, base station 205 may transmit the DCI in transmission 220 to UE 210 and transmit the DCI in transmission 230 to UE 215. In some aspects, transmission 220 and transmission 230 may correspond to separate transmissions from base station 205 (e.g., beamformed transmissions directed at each UE, using different DCIs, and the like) and/or may correspond to a single transmission from base station 205 (e.g., a multi-directional transmission, using a single DCI, and the like). More particular, base station 205 may transmit the DCI activating the set of configured grant resources to UE 210 and to UE 215 in a single transmission using one DCI and/or in separate transmissions using separate DCIs. Base station 205 may transmit the DCI(s) over PDCCH using a Uu interface. In some aspects, base station 205 may use a node-specific radio network temporary identifier (RNTI) to scramble the CRC of the DCI message used for activating/deactivating the CG type 2 resources (e.g., the set of configured grant resources) for UE 210 for transmissions to UE 215.

That is, in some examples the DCI formats used for activating/deactivating the CG type 2 resources for UE 210 and for UE 215 may be the same DCI. For example, base station 205 may configure a field in the DCI to indicate that the DCI is a reception mode DCI activating the set of configured grant resources for reception of the transmissions from UE 210. Accordingly, the transmitting mode and receive mode UEs (e.g., UE 210 and UE 215, respectively) may be differentiated by different field values in the DCI. For example, a source-node specific sidelink cell-specific RNTI (SL-CS-RNTI) may be used for both transmit mode and receive mode UEs (e.g., the configuration indices for DCI 3_0), which may serve to differentiate or partition the DCI into transmit mode and receive mode portions.

In another example, base station 205 may configure at least a portion of the DCI to indicate that the DCI is a reception mode DCI activating the set of resources for reception of the transmissions from UE 210. That is, the transmit mode and receive mode UEs may not be differentiated using different field values. Instead, a destination node-specific SL-CS-RNTI (e.g., an identifier corresponding to UE 215) may be used to differentiate between the receiving UE DCI (e.g., the DCI conveyed in transmission 230) and the transmitting UE DCI (e.g., the DCI conveyed in transmission 220).

In some examples, the DCI formats used for activating/deactivating CG type 2 DCIs at the transmitter side and receive side may be different. That is, base station 205 may configure a reception mode DCI or a transmit mode DCI activating the set of configured grant resources for reception of the transmissions from UE 210. In some aspects, the SL-CS-RNTI may be used for both transmit mode and receive mode UEs. The DCI formats (e.g., a new DCI 3_x format) may be used for the receive side activation/deactivation. The DCI may carry or otherwise convey various bit(s), field(s), information element(s) (IE)(s), and the like. For example, the format for the DCI conveyed in transmission 230 to UE 215 may indicate a time gap, a lowest index for a subchannel allocation for the transmissions, a frequency resource assignment or allocation, a time resource assignment or allocation, a configuration index, an uplink control channel resource indicator (e.g., a PUCCH resource indicator), and the like. Accordingly, the DCI conveyed to UE 210 in transmission 220 may use a different format, at least to some degree, than the format used for the DCI conveyed to UE 215 in transmission 230.

Accordingly, both UE 210 (e.g., the second UE or transmitting mode UE in this example) and UE 215 (e.g., the first UE or receiving mode UE in this example) may both receive an indication of the DCI(s) activating the set of configured grant resources (e.g., CG type 2 resources) for transmissions (e.g., transmission 225) from UE 210 to UE 215. UE 210 may perform the transmissions (e.g., sidelink transmissions) to UE 215 according to the DCI received in transmission 220 and transmission 230. That is, UE 210 may identify the resources allocated or otherwise activated in the DCI, and then use those resources for performing transmission 225 to UE 215. Transmission 225 may be performed according to PC5 interface protocols, e.g., sidelink transmissions.

UE 215, based on receiving the indication of the allocated or otherwise activated resources from base station 205, may therefore monitor or otherwise attempt to decode the resources identified/activated in the DCI to receive transmission 225 from UE 215. In some examples, the DCI may also identify a feedback resource and/or mechanism for a feedback message associated with the DCI and/or the transmissions from UE 210, e.g., feedback resources for UE 215 to use. Accordingly, UE 215 may transmit or otherwise convey a feedback message to base station 205 confirming receipt of the DCI and/or of the transmissions from UE 210.

In some examples, when UE 215 receives the DCI activating/deactivating resources for the receive mode UE (e.g., the set of CG type 2 resources activated in the DCI), UE 215 may transmit or otherwise convey a sidelink CG MAC CE confirmation to base station 205 to support base station 205 detecting the CG loss. This MAC CE confirmation mechanism may be, at least to some degree, similar to the MAC CE confirmation mechanism utilized by UE 210 for confirming receipt of the DCI activating the set of resources for the sidelink transmissions.

That is, in some examples UE 215 may configure a first portion of a subheader (e.g., the eight bit octet) of the feedback message (e.g., the MAC CE confirmation) associated with UE 215, and UE 210 may configure a second portion of the feedback message associated with UE 210. For example, UE 215 may configure the first portion of the subheader of the feedback message to confirm receipt of the DCI and/or receipt of the transmissions from UE 210. Accordingly, both the transmitting mode and receive mode UEs may share the same sidelink CG confirmation MAC CE (e.g., the 8 bit octet). The MAC CE may be partitioned into a transmitting mode and receiving mode and the corresponding configurations may also be partitioned similarly. For example, bits $C_0$-$C_3$ may be allocated or otherwise correspond to UE 210 and bits $C_4$-$C_7$ may be allocated or otherwise correspond to UE 215, or vice versa. Other configurations or allocations may also be supported, which may be preconfigured for UE 210 and UE 215 by base station 205 using RRC configuration signaling, as one non-limiting an example. That is, base station 205 may transmit a configuration signal identifying the first portion and the second portion of the subheader (e.g., the 8 bit octet in the MAC CE) to UE 210 and UE 215.

In some examples, a new receiver side CG confirmation MAC CE may be used as a feedback message from UE 215 to base station 205. For example, UE 215 may select a feedback message format associated with the DCI activating the set of configured grant resources for transmissions from UE 210 to UE 215. Accordingly, UE 215 may configure the feedback message to confirm receipt of the DCI and/or transmissions from UE 210 based on the feedback message format. In some aspects, this may include a new LCID being defined that corresponds to the receiving mode UE.

As discussed above, base station 205 may detect the CG loss using a DTX on PUCCH resources indicated in the DCI transmitted to UE 210. However, in some examples the PUCCH resources indicated in the DCI transmitted to UE 215 may be used for transmitting ACK/NACK bits to base station 205 in response to either the sidelink receptions from UE 210 or the DCI itself. For example, if base station 205 detects a DTX on that PUCCH resource, this may indicate that the DCI to the receive mode UE (e.g., UE 215) has been lost. UE 215 may determine that the DCI from base station 205 was successfully decoded, but that the transmissions from UE 210 are unable to be successfully decoded by UE 215. Accordingly, UE 215 may configure the feedback message with a positive (e.g., ACK when the transmissions from UE 215 are successfully decoded) or a negative (e.g., NACK when the transmissions from UE 215 are not able to be successfully decoded) acknowledgment indication for the transmissions from UE 210. This may implicitly convey an acknowledgment indication (e.g., ACK) for the DCI.

Accordingly, UE 215 may transmit or otherwise convey an indication of the feedback message to base station 205 according to these techniques. The feedback message (e.g., MAC CE confirmation) may be transmitted or otherwise conveyed directly to base station 205 (e.g., over the Uu interface) and/or may be transmitted or otherwise conveyed indirectly to base station 205 (e.g., may be transmitted to UE 210 over the PC5 interface, which then forwards the feedback message to base station 205 via the Uu interface).

Figure 3:
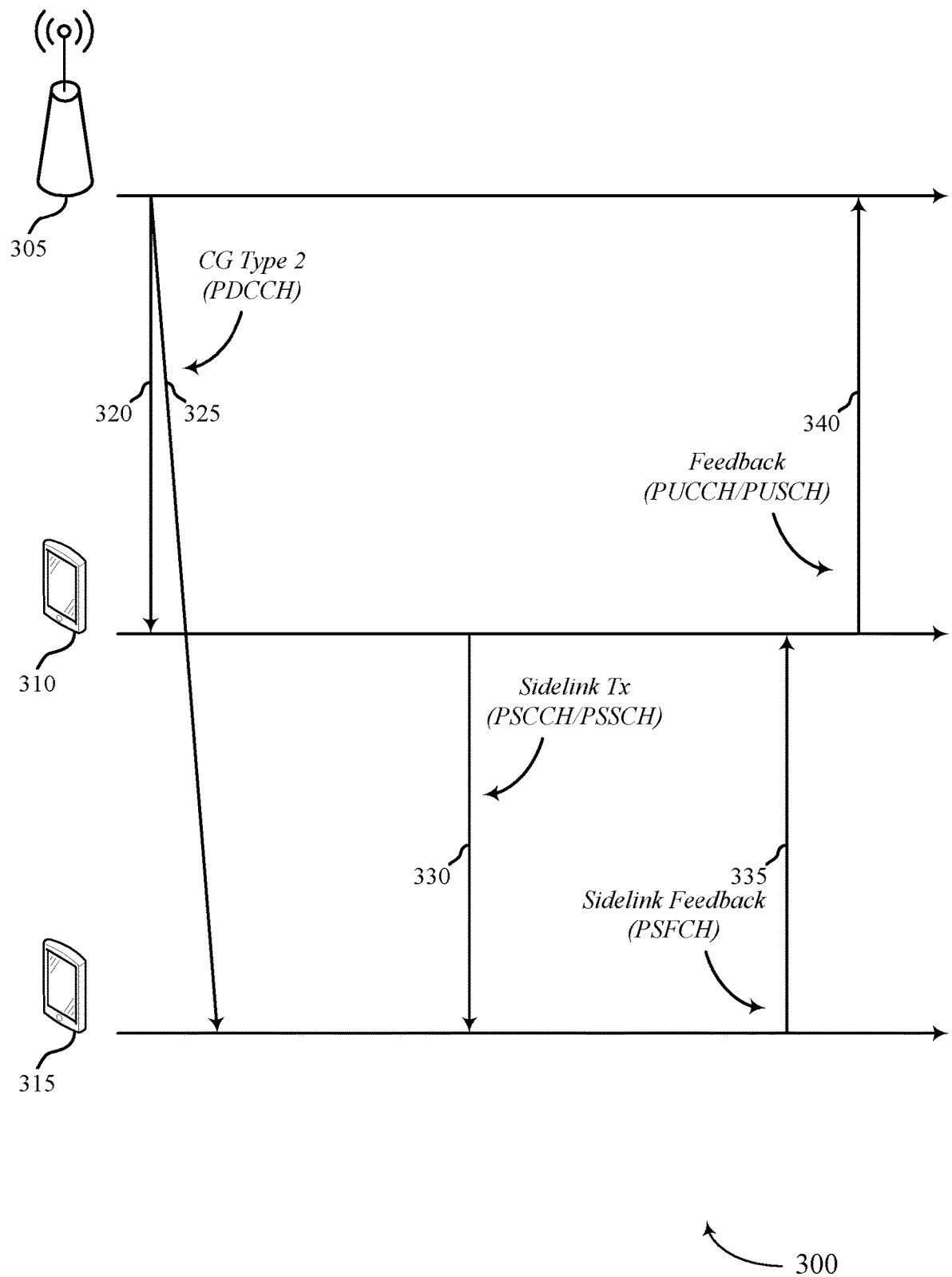
FIG. 3 illustrates an example of a wireless communication system that supports delivering configured grants to sidelink receivers with confirmation in accordance with aspects of the present disclosure.

FIG. 3 illustrates an example of a wireless communication system 300 that supports delivering configured grants to sidelink receivers with confirmation in accordance with aspects of the present disclosure. In some examples, wireless communication system 300 may implement aspects of wireless communication systems 100 and/or 200. Wireless communication system 300 may include base station 305, UE 310, and UE 315, which may be examples of corresponding devices described herein. In some aspects, UE 310 may be considered a transmitting mode UE or second UE and UE 315 may be considered a receiving mode UE or first UE.

As discussed above, aspects of the described techniques provide a mechanism for base station 305 to inform UE 315 of resources being activated for transmissions from UE 310 to UE 315. The transmissions may be sidelink transmissions (e.g., PSCCH and/or PSSCH transmissions) performed using a PC5 interface. For example, base station 305 may transmit or otherwise convey the DCI to UE 310 in transmission 320 and to UE 315 in transmission 325. The DCI conveyed to UE 310 in transmission 320 may be the same DCI transmitted to UE 315 in transmission 325, that may be differentiated based on various fields, identifiers, and the like, between the transmitting mode UE (e.g., UE 310) and the receiving mode UE (e.g., UE 315). In some examples, separate DCIs may be conveyed to UE 310 in transmission 320 and UE 315 in transmission 325. That is, a DCI format may be used for the DCI transmitted to UE 315 in transmission 325 that is associated with the reception mode DCI (e.g., a DCI configured for the receiving mode UE). As discussed, the DCI(s) transmitted to UE 310 and 315 may identify or otherwise activate a set of configured grant resources for transmissions from UE 310 to UE 315, which may include CG type 2 resources in some examples.

UE 310 may provide the transmissions to UE 315 in transmission 330. The transmissions to UE 315 may include sidelink transmissions (e.g., PSCCH and/or PSSCH transmissions) utilizing a PC5 interface or any other direct UE-to-UE transmissions. As discussed above, in some examples UE 310 may correspond to a PLC and UE 315 may correspond to a S/A within a factory automation setting.

As also discussed above, in some examples the DCI(s) conveyed to UE 310 and/or UE 315 may identify a feedback resource for a feedback message from UE 315 for the DCI and/or for the transmissions from UE 310. The feedback resources may correspond to sidelink resources (e.g., PSFCH resources) and/or cellular resources (e.g., PUCCH and/or PUSCH resources). Accordingly, UE 315 may transmit a feedback message to base station 305 according to the DCI, e.g., using the feedback resources and/or mechanism indicated in the DCI. For example, UE 315 may transmit the feedback message to UE 310 in transmission 335. UE 315 may transmit the feedback message to UE 310 according to the PC5 interface (e.g., using a PSFCH transmission). UE 310 may transmit or otherwise forward the feedback message from UE 315 (as well as from UE 310) to base station 305 in transmission 340. UE 310 may transmit the feedback message to base station 305 according to the Uu interface (e.g., using a PUCCH and/or PUSCH transmission).

As discussed above, aspects of the described techniques may support the feedback message using the same MAC CE confirmation mechanism as is utilized by UE 310, but with the MAC CE partitioned between UE 310 and UE 315. For example, UE 315 may configure a first portion of the MAC CE subheader (e.g., the 8 bit octet) with its feedback information for the DCI and/or for the sidelink transmissions from UE 310. UE 310 may then configure the second portion of the MAC CE subheader with its feedback message for the DCI and/or for the sidelink transmissions as acknowledged by UE 315. As also discussed above, aspects of the described techniques may also support the feedback message using separate MAC CE confirmation mechanisms, e.g., a new receiver side CG confirmation MAC CE may be utilized by UE 315 when transmitting its feedback message.

As also discussed above, in some examples the DCI conveyed to UE 315 may identify a PUCCH and/or PUSCH resources to be used for sending the feedback message (e.g., ACK/NACK bits) to base station 305 in response to either the sidelink receptions for the DCI itself. Accordingly, UE 315 may transmit the feedback message to base station 305 directly over PUCCH and/or PUSCH.

Figure 4:
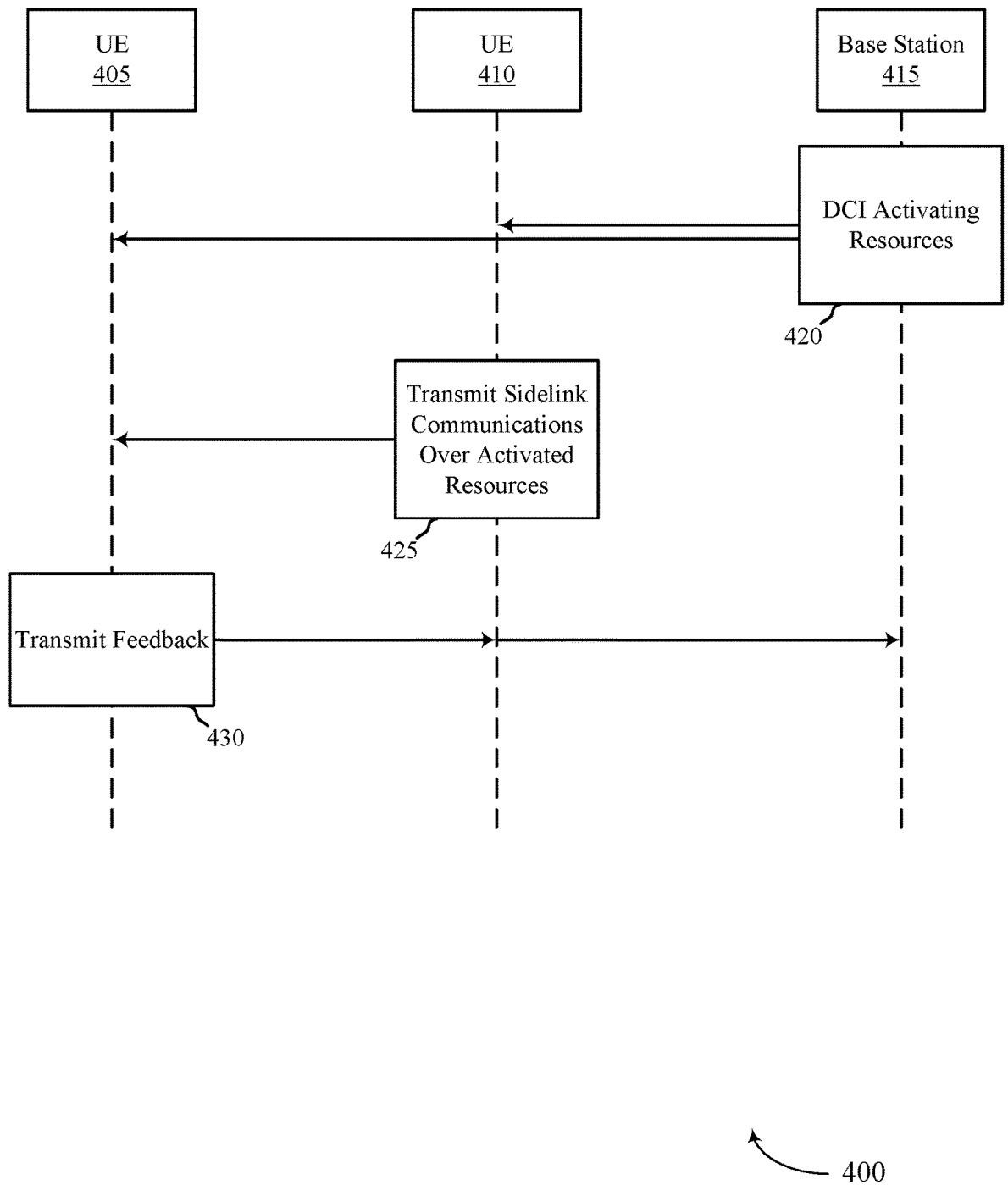
FIG. 4 illustrates an example of a process that supports delivering configured grants to sidelink receivers with confirmation in accordance with aspects of the present disclosure.

FIG. 4 illustrates an example of a process 400 that supports delivering configured grants to sidelink receivers with confirmation in accordance with aspects of the present disclosure. In some examples, process 400 may implement aspects of wireless communication systems 100, 200, and/or 300. Aspects of process 400 may be implemented by UE 405, UE 410, and base station 415, which may be examples of the corresponding devices described herein. In some aspects, UE 405 may be an example of a receiving mode UE or first UE and UE 410 may be an example of a transmitting mode UE or second UE.

At 420, base station 415 may transmit (and UE 405 and UE 410 may receive) a DCI activating a set of configured grant resources for transmissions from UE 410 to UE 405. In some examples, the DCI may carry or otherwise convey information identifying a feedback resource for a feedback message associated with the DCI and/or the transmissions from UE 410 to UE 405. In some aspects, this may include UE 405 (e.g., the receive mode or first UE in this example) determining that the DCI is a reception mode DCI activating the set of resources (e.g., based on a field, bit, IE, etc.). In some aspects, this may include UE 405 determining that the DCI is a reception mode DCI (e.g., is directed to the receiving mode UE, which is UE 405 in this example) based on an identifier (e.g., SL-CS-RNTI) used to scramble at least a portion of the DCI (e.g., CRC). In some examples, this may include separate DCIs being used. For example, UE 405 may determine that the format of the DCI corresponds to a reception mode DCI activating the set of resources.

Accordingly and at 425, UE 410 may transmit (and UE 405 may receive) the transmissions according to the DCI. For example, this may include UE 410 identifying the resources activated in the DCI and performing the transmissions to UE 405 using the activated resources. This may also include UE 405 identifying the resources that are activated in the DCI and monitoring and decoding the waveform corresponding to the transmissions from UE 410.

At 430, UE 405 may transmit (and UE 410 and base station 415 may receive) a feedback message confirming receipt of the DCI and/or receipt of the transmissions from UE 410. In some examples, the feedback message may correspond to a MAC CE confirmation transmitted by UE 405. For example, UE 405 may identify a first portion of a subheader (e.g., an 8 bit octet) of the feedback message (e.g., of the MAC CE) that is associated with UE 405 and a second portion of the subheader of the feedback message associated with UE 410. UE 405 may configure the first portion of the subheader to confirm receipt of the DCI and/or receipt of transmissions from UE 410. In this example, UE 410 may receive the feedback message from UE 405, configure the second portion of the subheader to confirm receipt of the DCI and/or successful transmissions to UE 405, and then transmit the feedback message to base station 415. Base station 415 may transmit a configuration signal to UE 405 and UE 410 identifying the first portion and second portion of the subheader (e.g., identifying the allocation of bits to UE 405 and allocation of bits to UE 410 in the MAC CE subheader).

In some aspects, the format of the feedback message may be such that it is associated with the receiving mode UE (e.g., UE 405). That is, UE 405 may select a feedback message format associated with the receive mode UE and configure the feedback message to confirm receipt of the DCI and/or receipt of the transmissions from UE 410 based on the feedback message format, e.g., the feedback message format may correspond to UE 405 (e.g., a new MAC CE confirmation format).

In some aspects, UE 405 may configure the feedback message with an ACK/NACK indication for receipt of the transmissions from UE 410. This may implicitly indicate an acknowledgment indication (e.g., ACK) for the DCI.

Figure 5:
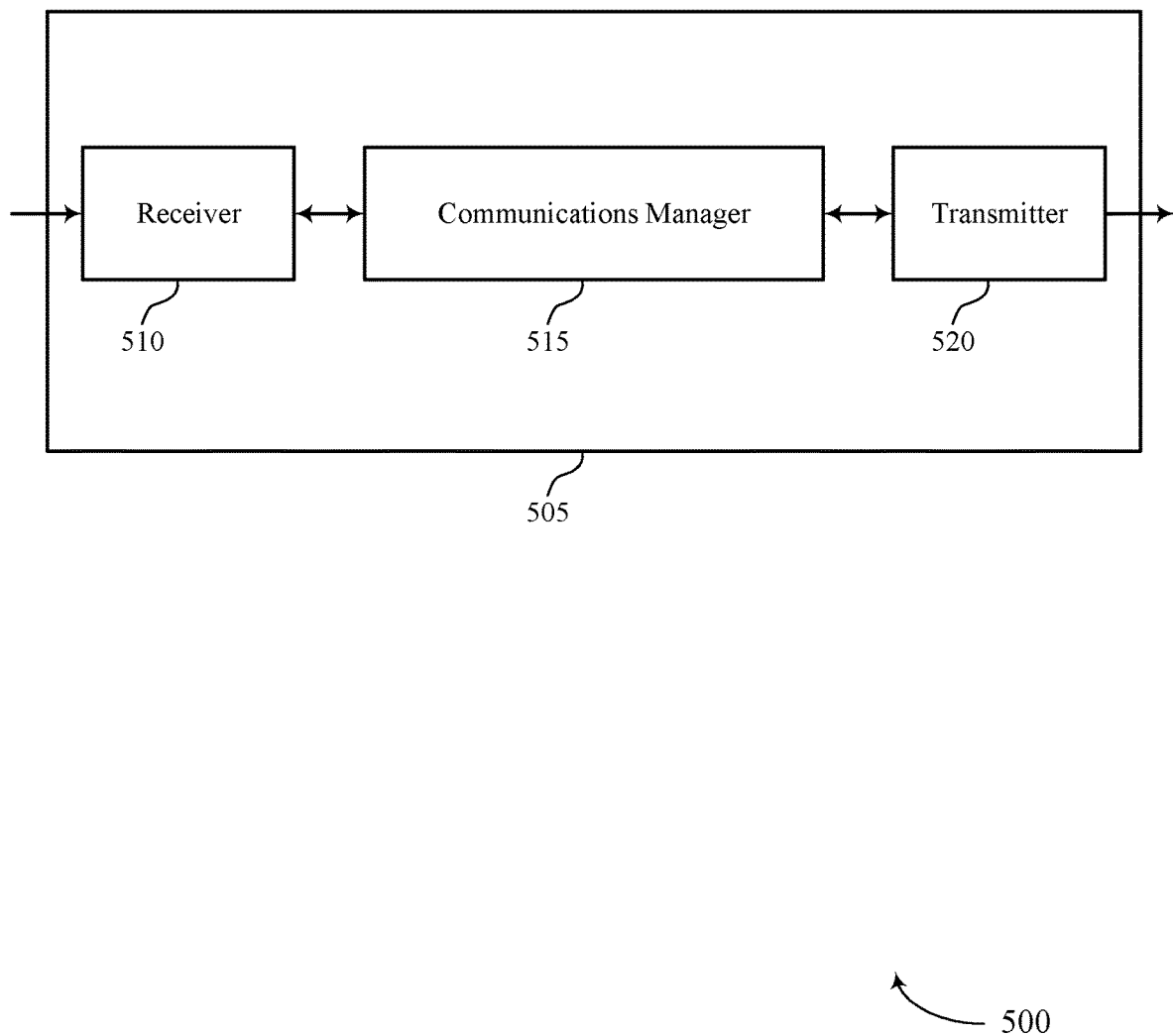
FIGS. 5 and 6 show block diagrams of devices that support delivering configured grants to sidelink receivers with confirmation in accordance with aspects of the present disclosure.

FIG. 5 shows a block diagram 500 of a device 505 that supports delivering configured grants to sidelink receivers with confirmation in accordance with aspects of the present disclosure. The device 505 may be an example of aspects of a UE 115 as described herein (e.g., a first UE). The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to delivering configured grants to sidelink receivers with confirmation, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may receive, from a base station associated with the first UE and a second UE, a DCI activating a set of configured grant resources for transmissions from the second UE to the first UE, and transmit, according to the DCI, a feedback message to the base station confirming receipt of the DCI. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
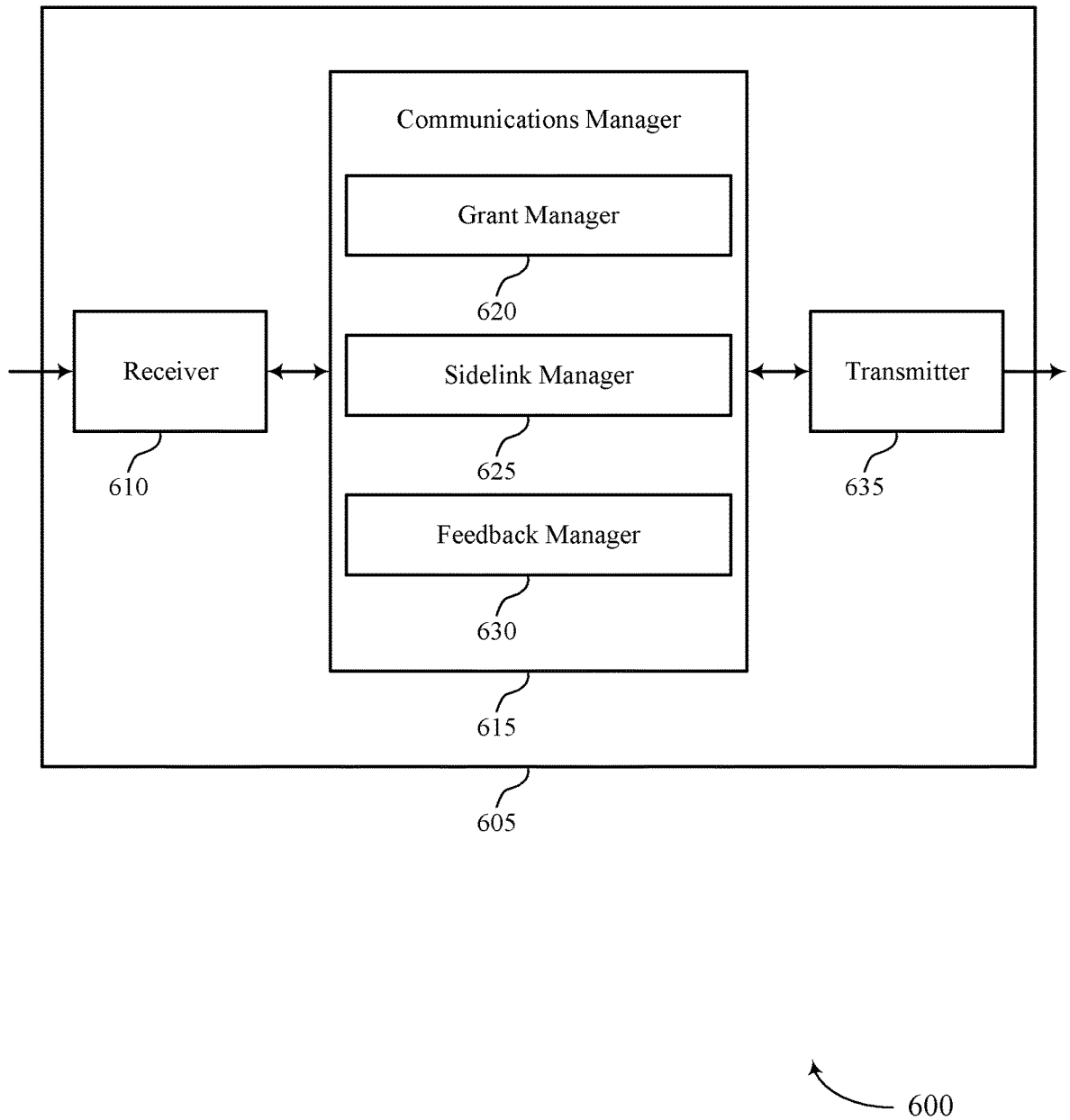

FIG. 6 shows a block diagram 600 of a device 605 that supports delivering configured grants to sidelink receivers with confirmation in accordance with aspects of the present disclosure. The device 605 may be an example of aspects of a device 505, or a UE 115 as described herein (e.g., a first UE). The device 605 may include a receiver 610, a communications manager 615, and a transmitter 635. The device 605 may also include a processor. Each of these components may be in communication with one another (e.g., via one or more buses).

The receiver 610 may receive information such as packets, user data, or control information associated with various information channels (e.g., control channels, data channels, and information related to delivering configured grants to sidelink receivers with confirmation, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a grant manager 620, a sidelink manager 625, and a feedback manager 630. The communications manager 615 may be an example of aspects of the communications manager 810 described herein.

The grant manager 620 may receive, from a base station associated with the first UE and a second UE, a DCI activating a set of configured grant resources for transmissions from the second UE to the first UE.

The sidelink manager 625 may receive the transmissions from the second UE according to the DCI.

The feedback manager 630 may transmit, according to the DCI, a feedback message to the base station confirming receipt of the DCI.

The transmitter 635 may transmit signals generated by other components of the device 605. In some examples, the transmitter 635 may be collocated with a receiver 610 in a transceiver module. For example, the transmitter 635 may be an example of aspects of the transceiver 820 described with reference to FIG. 8. The transmitter 635 may utilize a single antenna or a set of antennas.

Figure 7:
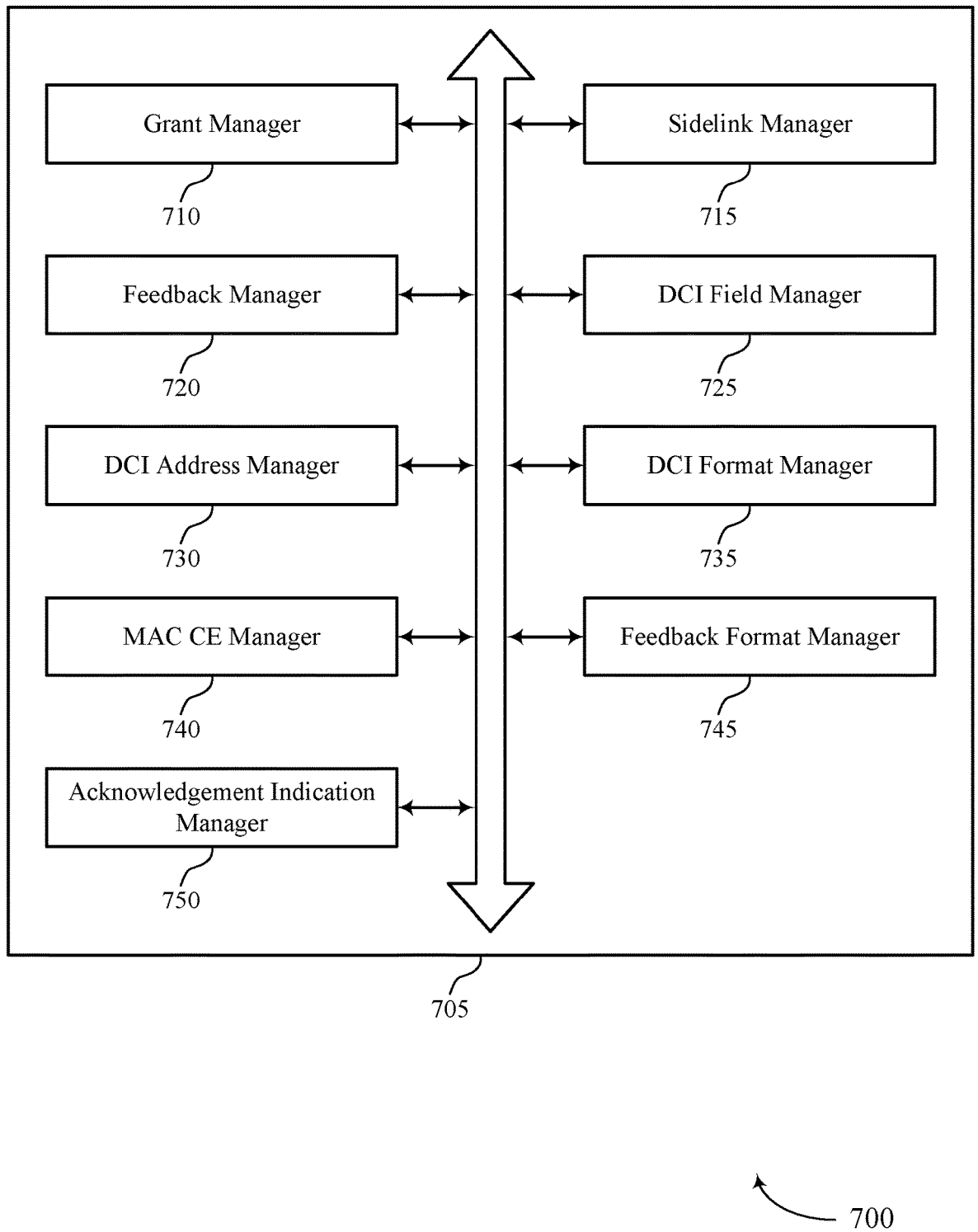
FIG. 7 shows a block diagram of a communications manager that supports delivering configured grants to sidelink receivers with confirmation in accordance with aspects of the present disclosure.

FIG. 7 shows a block diagram 700 of a communications manager 705 that supports delivering configured grants to sidelink receivers with confirmation in accordance with aspects of the present disclosure. The communications manager 705 may be an example of aspects of a communications manager 515, a communications manager 615, or a communications manager 810 described herein. The communications manager 705 may include a grant manager 710, a sidelink manager 715, a feedback manager 720, a DCI field manager 725, a DCI address manager 730, a DCI format manager 735, a MAC CE manager 740, a feedback format manager 745, and an acknowledgement indication manager 750. Each of these modules may communicate, directly or indirectly, with one another (e.g., via one or more buses).

The grant manager 710 may receive, from a base station associated with the first UE and a second UE, a DCI activating a set of configured grant resources for transmissions from the second UE to the first UE.

The sidelink manager 715 may receive the transmissions from the second UE according to the DCI.

The feedback manager 720 may transmit, according to the DCI, a feedback message to the base station confirming receipt of the DCI.

The feedback manager 720 may transmit the second feedback message to the base station confirming receipt of the transmissions from the second UE.

The DCI field manager 725 may determine, based on a field in the DCI, that the DCI includes a reception mode DCI activating the set of resources for reception of the transmissions from the second UE.

The DCI address manager 730 may determine, based on an destination identifier used to scramble at least a portion of the DCI, that the DCI includes a reception mode DCI activating the set of resources for reception of the transmissions from the second UE.

The DCI format manager 735 may determine, based on a format associated with the DCI, that the DCI includes a reception mode DCI activating the set of resources for reception of the transmissions from the second UE. In some cases, the format associated with the DCI indicates at least a time gap, a lowest index for a subchannel allocation for the transmissions, a frequency resource allocation, a time resource allocation, a configuration index, an uplink control channel resource indicator, or a combination thereof.

The MAC CE manager 740 may identify a first portion of a subheader of the feedback message associated with the first UE and a second portion of the subheader of the feedback message associated with the second UE. In some examples, the MAC CE manager 740 may configure the first portion of the subheader of the feedback message to confirm receipt of the DCI, the transmissions from the second UE, or a combination thereof. In some examples, the MAC CE manager 740 may receive, from the base station, a configuration signal identifying the first portion and the second portion of the subheader.

The feedback format manager 745 may select a feedback message format associated with the DCI activating the set of resources for transmissions from the second UE to the first UE. In some examples, the feedback format manager 745 may configure the feedback message to confirm receipt of the DCI, the transmissions from the second UE, or a combination thereof, based on the feedback message.

The acknowledgement indication manager 750 may determine that the DCI from the base station was successfully decoded by the first UE. In some examples, the acknowledgement indication manager 750 may determine that the transmissions from the second UE were unable to be successfully decoded by the first UE. In some examples, the acknowledgement indication manager 750 may configure the feedback message with a positive or negative acknowledgement indication for the transmissions from the second UE, which conveys an acknowledgement indication for the DCI.

Figure 8:
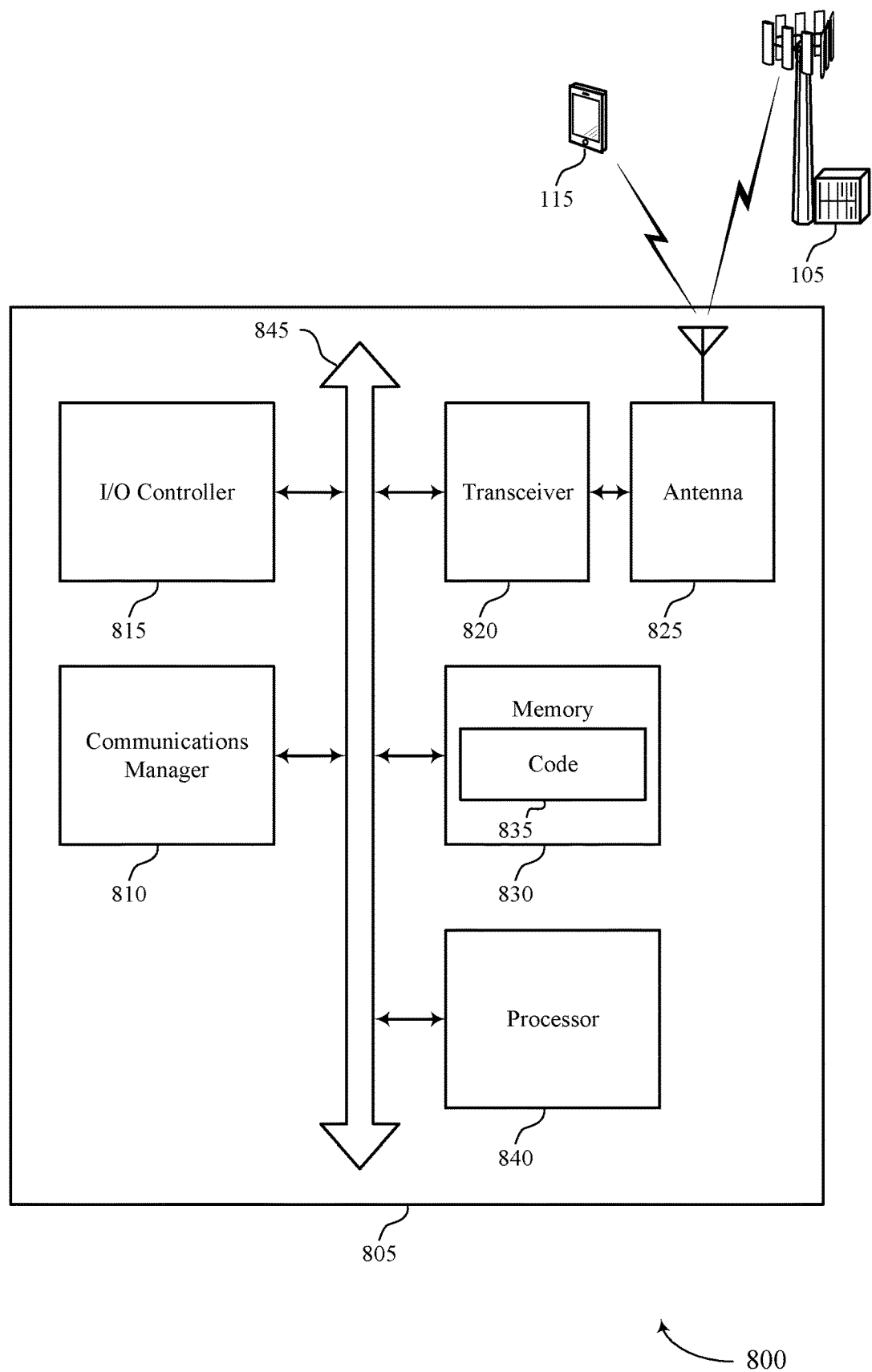
FIG. 8 shows a diagram of a system including a device that supports delivering configured grants to sidelink receivers with confirmation in accordance with aspects of the present disclosure.

FIG. 8 shows a diagram of a system 800 including a device 805 that supports delivering configured grants to sidelink receivers with confirmation in accordance with aspects of the present disclosure. The device 805 may be an example of or include the components of device 505, device 605, or a UE 115 as described herein (e.g., a first UE). The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may receive, from a base station associated with the first UE and a second UE, a DCI activating a set of configured grant resources for transmissions from the second UE to the first UE, and transmit, according to the DCI, a feedback message to the base station confirming receipt of the DCI.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random access memory (RAM) and read-only memory (ROM). The memory 830 may store computer-readable, computer-executable code 835 including instructions that, when executed, cause the processor to perform various functions described herein. In some cases, the memory 830 may contain, among other things, a basic input/output system (BIOS) which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting delivering configured grants to sidelink receivers with confirmation).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
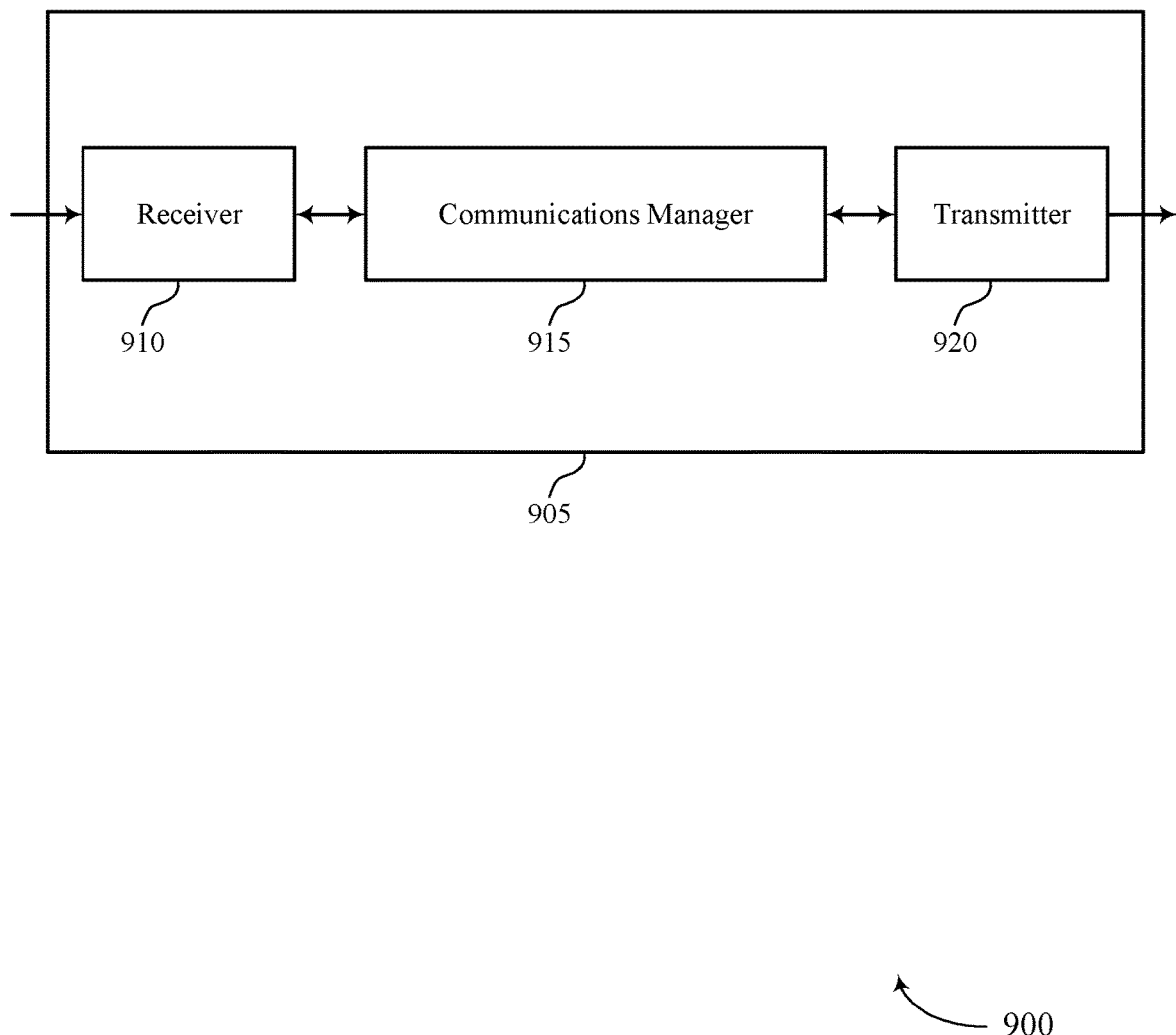
FIGS. 9 and 10 show block diagrams of devices that support delivering configured grants to sidelink receivers with confirmation in accordance with aspects of the present disclosure.

FIG. 9 shows a block diagram 900 of a device 905 that supports delivering configured grants to sidelink receivers with confirmation in accordance with aspects of the present disclosure. The device 905 may be an example of aspects of a base station 105 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to delivering configured grants to sidelink receivers with confirmation, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may determine that a second UE is to perform transmissions to a first UE, transmit, to at least the first UE, a DCI activating a set of configured grant resources for transmissions from the second UE to the first UE, and receive, from the first UE and according to the DCI, a feedback message confirming receipt of the DCI. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
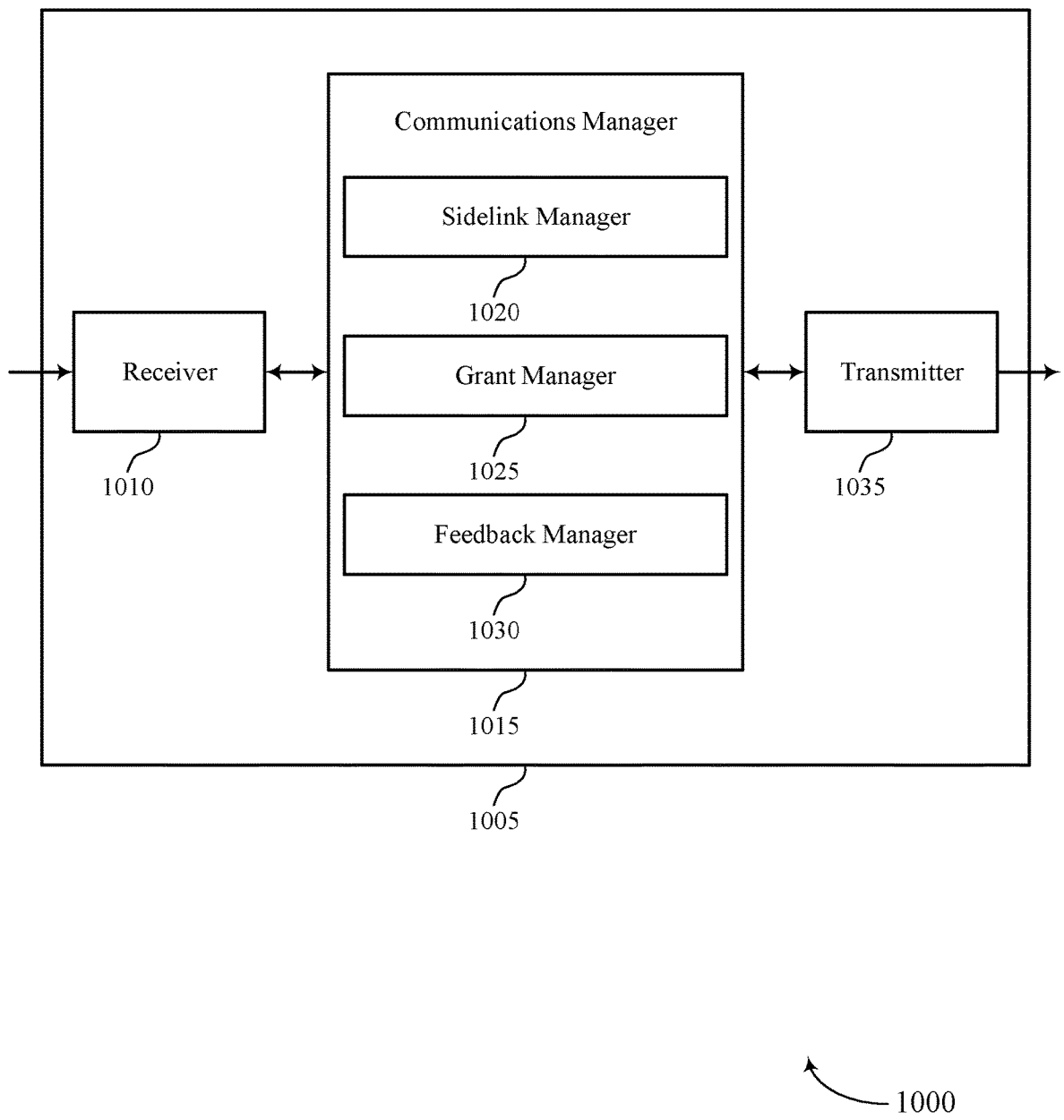

FIG. 10 shows a block diagram 1000 of a device 1005 that supports delivering configured grants to sidelink receivers with confirmation in accordance with aspects of the present disclosure. The device 1005 may be an example of aspects of a device 905, or a base station 105 as described herein. The device 1005 may include a receiver 1010, a communications manager 1015, and a transmitter 1035. The device 1005 may also include a processor. Each of these components may be in communication with one another (e.g., via one or more buses).

The receiver 1010 may receive information such as packets, user data, or control information associated with various information channels (e.g., control channels, data channels, and information related to delivering configured grants to sidelink receivers with confirmation, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a sidelink manager 1020, a grant manager 1025, and a feedback manager 1030. The communications manager 1015 may be an example of aspects of the communications manager 1210 described herein.

The sidelink manager 1020 may determine that a second UE is to perform transmissions to a first UE.

The grant manager 1025 may transmit, to at least the first UE, a DCI activating a set of resources for transmissions from the second UE to the first UE.

The feedback manager 1030 may receive, from the first UE and according to the DCI, a feedback message confirming receipt of the DCI.

The transmitter 1035 may transmit signals generated by other components of the device 1005. In some examples, the transmitter 1035 may be collocated with a receiver 1010 in a transceiver module. For example, the transmitter 1035 may be an example of aspects of the transceiver 1220 described with reference to FIG. 12. The transmitter 1035 may utilize a single antenna or a set of antennas.

Figure 11:
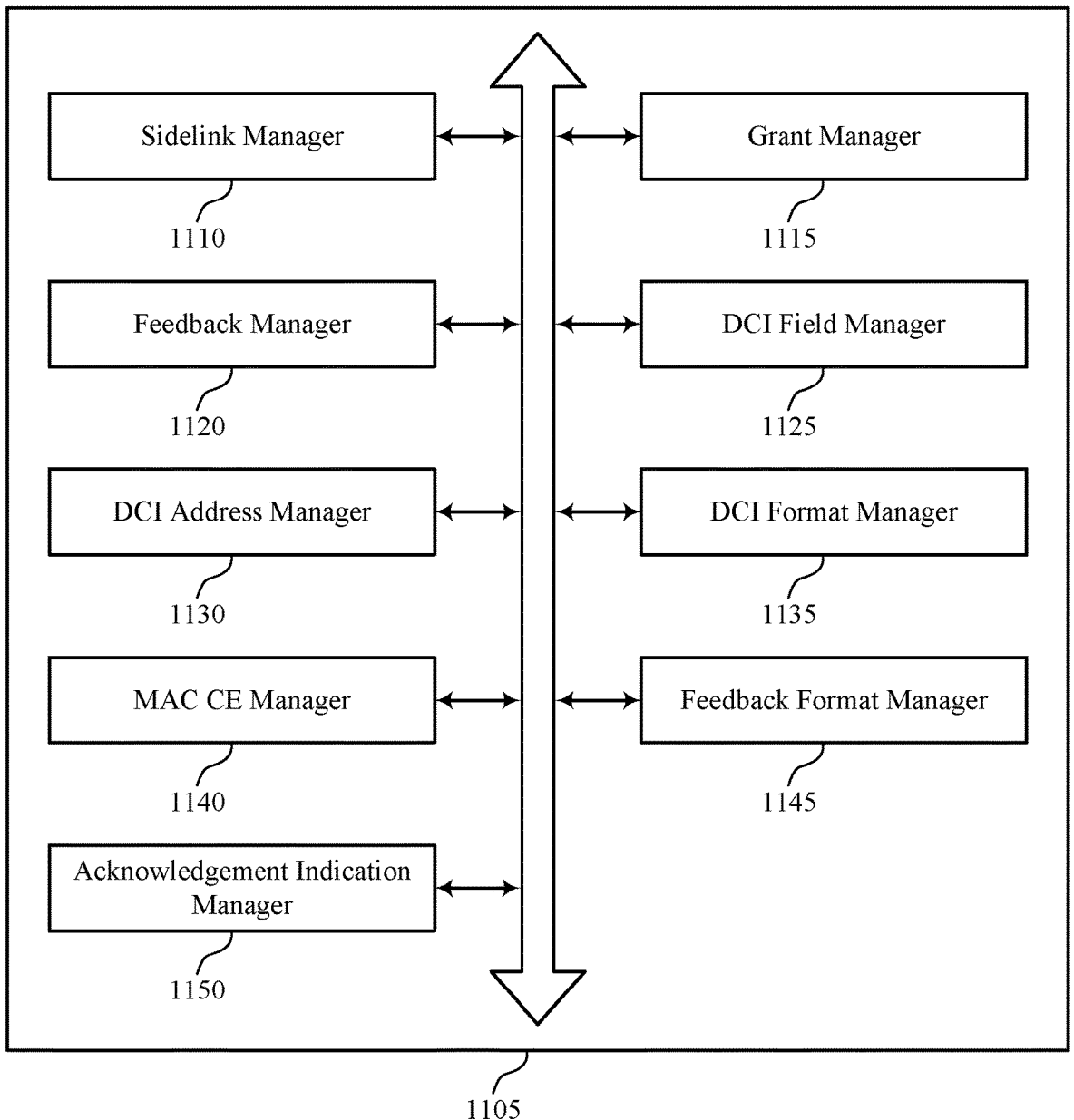
FIG. 11 shows a block diagram of a communications manager that supports delivering configured grants to sidelink receivers with confirmation in accordance with aspects of the present disclosure.

FIG. 11 shows a block diagram 1100 of a communications manager 1105 that supports delivering configured grants to sidelink receivers with confirmation in accordance with aspects of the present disclosure. The communications manager 1105 may be an example of aspects of a communications manager 915, a communications manager 1015, or a communications manager 1210 described herein. The communications manager 1105 may include a sidelink manager 1110, a grant manager 1115, a feedback manager 1120, a DCI field manager 1125, a DCI address manager 1130, a DCI format manager 1135, a MAC CE manager 1140, a feedback format manager 1145, and an acknowledgement indication manager 1150. Each of these modules may communicate, directly or indirectly, with one another (e.g., via one or more buses).

The sidelink manager 1110 may determine that a second UE is to perform transmissions to a first UE.

The grant manager 1115 may transmit, to at least the first UE, a DCI activating a set of configured grant resources for transmissions from the second UE to the first UE.

The feedback manager 1120 may receive, from the first UE and according to the DCI, a feedback message confirming receipt of the DCI.

The feedback manager 1120 may receive, from the first UE and according to the DCI, the second feedback message confirming receipt of the transmissions from the second UE.

The DCI field manager 1125 may configure a field in the DCI to indicate that the DCI includes a reception mode DCI activating the set of resources for reception of the transmissions from the second UE.

The DCI address manager 1130 may select a destination identifier used to scramble at least a portion of the DCI to indicate that the DCI includes a reception mode DCI activating the set of resources for reception of the transmissions from the second UE.

The DCI format manager 1135 may select a format associated with the DCI to indicate that the DCI includes a reception mode DCI activating the set of resources for reception of the transmissions from the second UE. In some cases, the format associated with the DCI indicates at least a time gap, a lowest index for a subchannel allocation for the transmissions, a frequency resource allocation, a time resource allocation, a configuration index, an uplink control channel resource indicator, or a combination thereof.

The MAC CE manager 1140 may determine, based on a first portion of a subheader of the feedback message associated with the first UE and a second portion of the subheader of the feedback message associated with the second UE, that the first portion of the feedback message confirms receipt of the DCI, the transmissions from the second UE, or a combination thereof. In some examples, the MAC CE manager 1140 may receive, from the base station, a configuration signal identifying the first portion and the second portion of the subheader.

The feedback format manager 1145 may determine that the feedback message includes a feedback message format associated with the DCI activating the set of resources for transmissions from the second UE to the first UE. In some examples, the feedback format manager 1145 may decode the feedback message to confirm receipt of the DCI, the transmissions from the second UE, or a combination thereof, based on the feedback message format.

The acknowledgement indication manager 1150 may determine that the feedback message includes a positive or negative acknowledgement indication for the transmissions from the second UE, which conveys an acknowledgement indication for the DCI.

Figure 12:
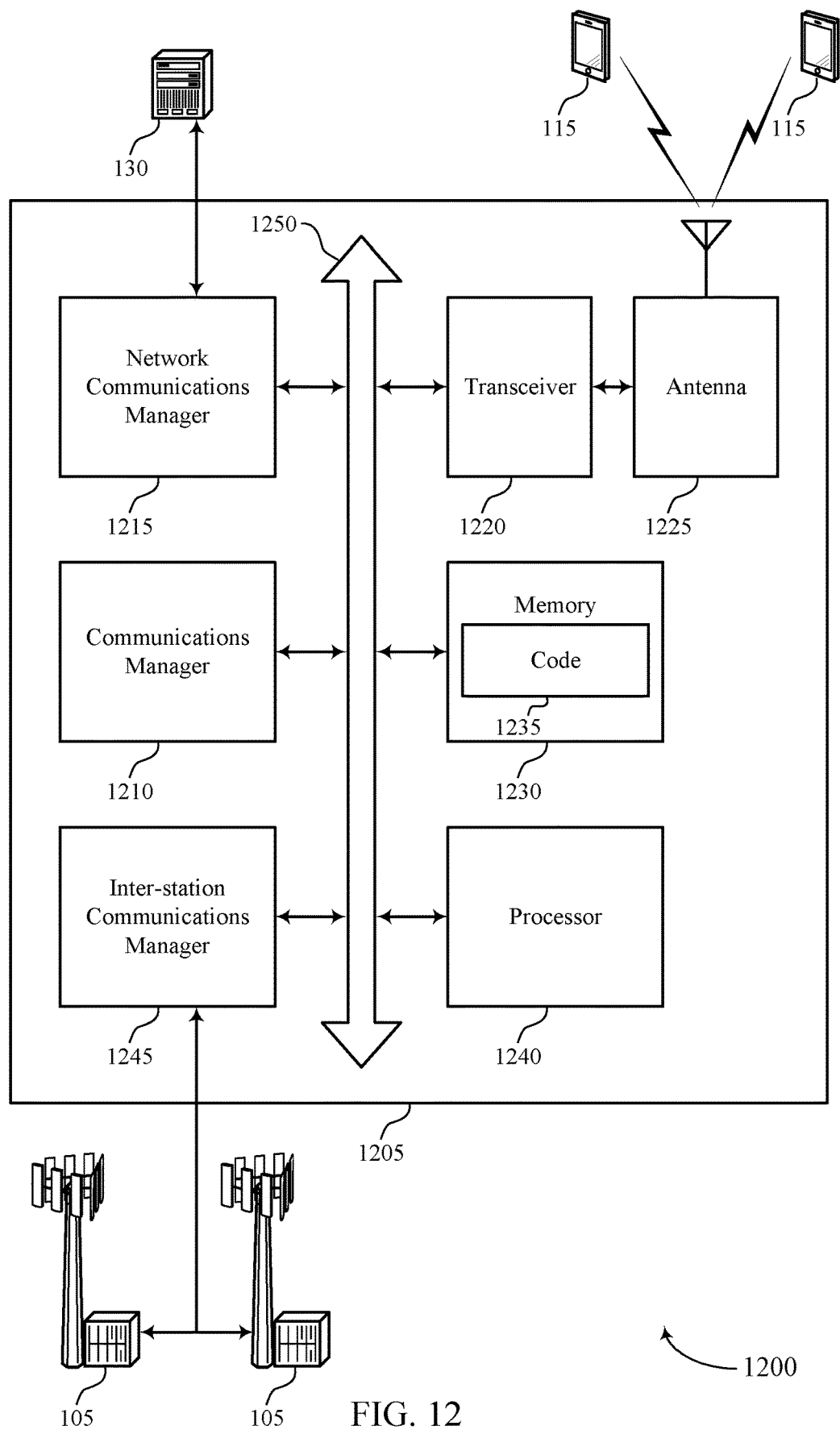
FIG. 12 shows a diagram of a system including a device that supports delivering configured grants to sidelink receivers with confirmation in accordance with aspects of the present disclosure.

FIG. 12 shows a diagram of a system 1200 including a device 1205 that supports delivering configured grants to sidelink receivers with confirmation in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may determine that a second UE is to perform transmissions to a first UE, transmit, to at least the first UE, a DCI activating a set of configured grant resources for transmissions from the second UE to the first UE, and receive, from the first UE and according to the DCI, a feedback message confirming receipt of the DCI.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting delivering configured grants to sidelink receivers with confirmation).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
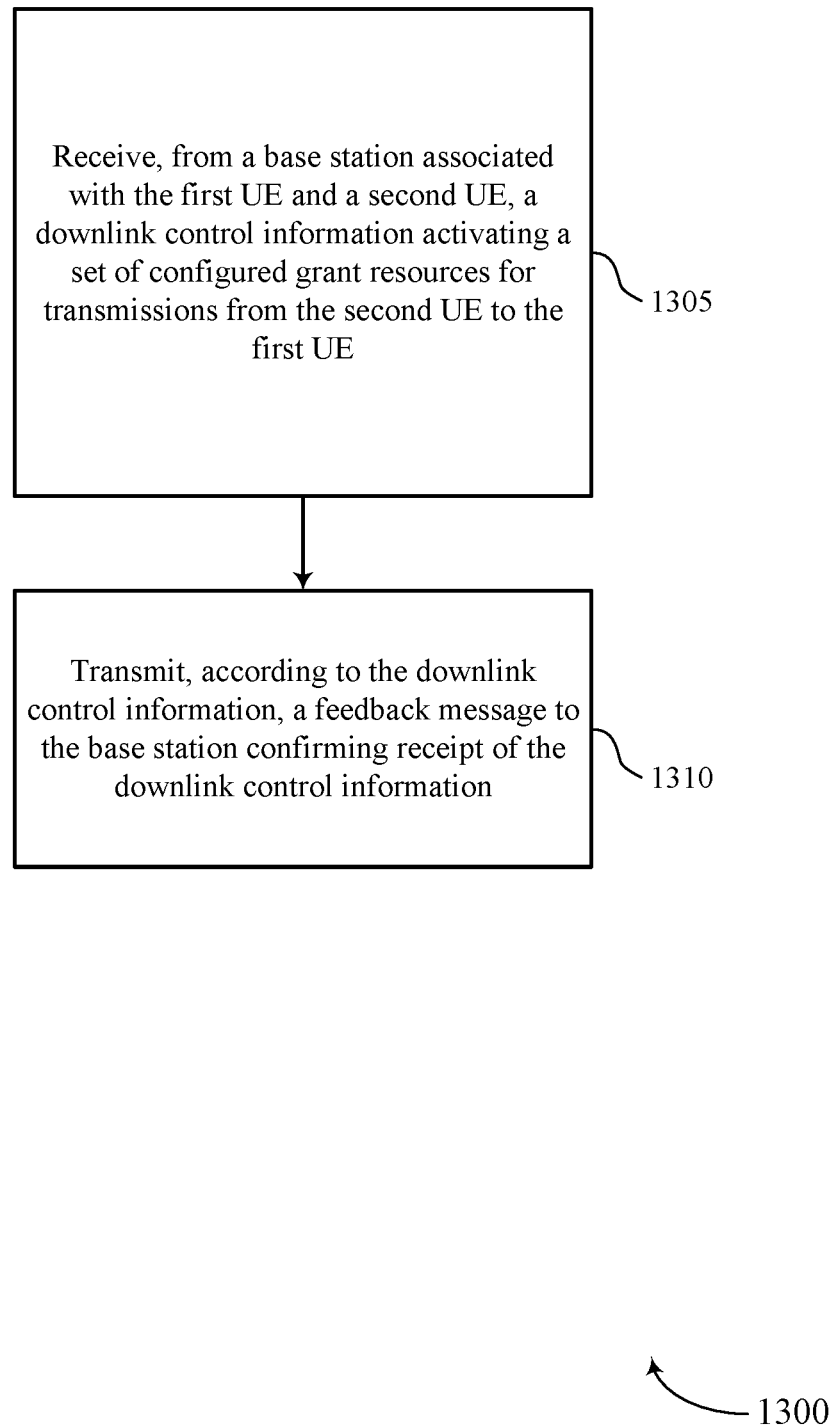
FIGS. 13 through 17 show flowcharts illustrating methods that support delivering configured grants to sidelink receivers with confirmation in accordance with aspects of the present disclosure.

FIG. 13 shows a flowchart illustrating a method 1300 that supports delivering configured grants to sidelink receivers with confirmation in accordance with aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1305, the UE may receive, from a base station associated with the first UE and a second UE, a DCI activating a set of configured grant resources for transmissions from the second UE to the first UE. The operations of 1305 may be performed according to the methods described herein. In some examples, aspects of the operations of 1305 may be performed by a grant manager as described with reference to FIGS. 5 through 8.

At 1310, the UE may transmit, according to the DCI, a feedback message to the base station confirming receipt of the DCI. The operations of 1310 may be performed according to the methods described herein. In some examples, aspects of the operations of 1310 may be performed by a feedback manager as described with reference to FIGS. 5 through 8.

Figure 14:
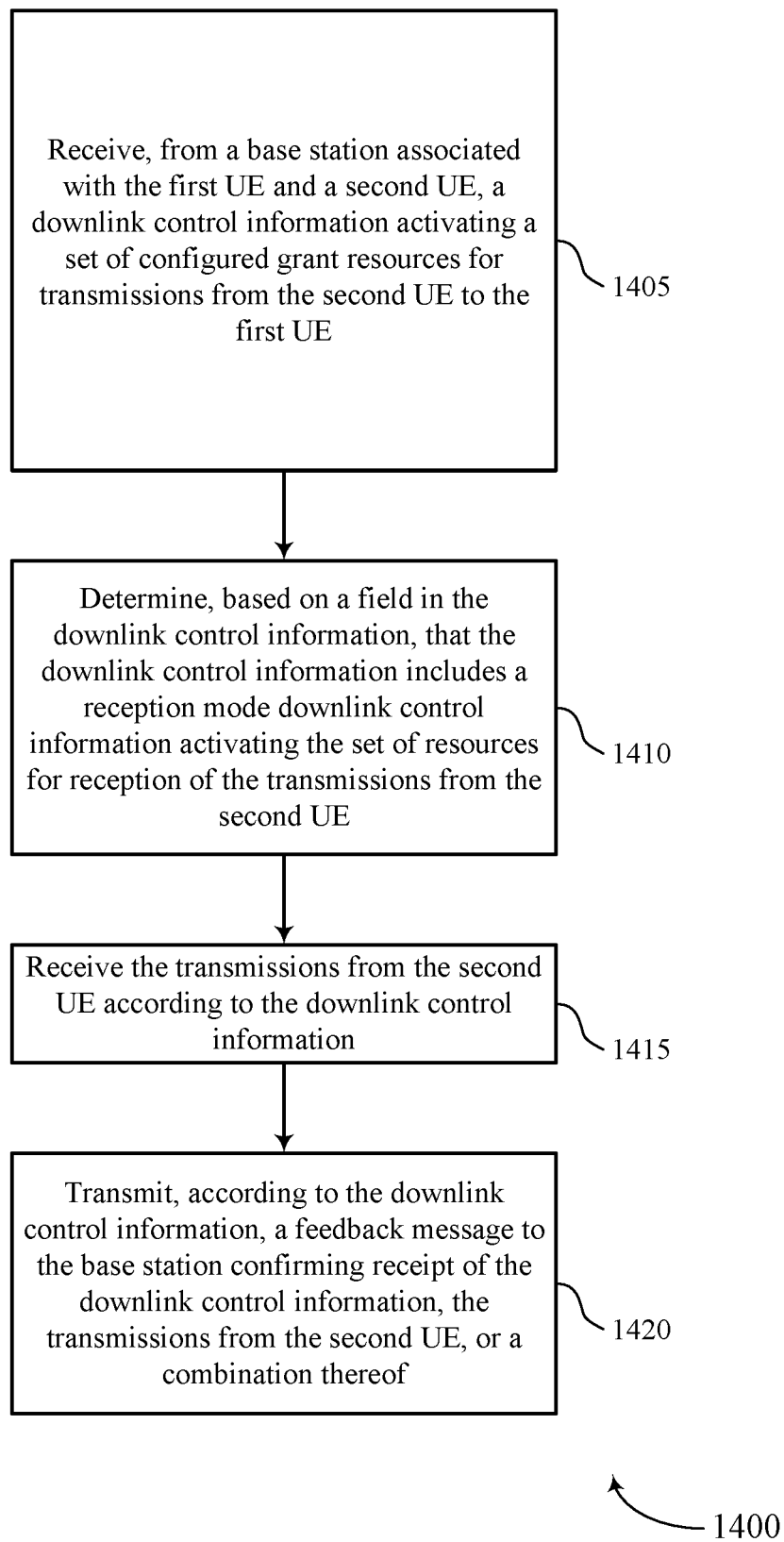

FIG. 14 shows a flowchart illustrating a method 1400 that supports delivering configured grants to sidelink receivers with confirmation in accordance with aspects of the present disclosure. The operations of method 1400 may be implemented by a UE 115 or its components as described herein. For example, the operations of method 1400 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1405, the UE may receive, from a base station associated with the first UE and a second UE, a DCI activating a set of configured grant resources for transmissions from the second UE to the first UE. The operations of 1405 may be performed according to the methods described herein. In some examples, aspects of the operations of 1405 may be performed by a grant manager as described with reference to FIGS. 5 through 8.

At 1410, the UE may determine, based on a field in the DCI, that the DCI includes a reception mode DCI activating the set of resources for reception of the transmissions from the second UE. The operations of 1410 may be performed according to the methods described herein. In some examples, aspects of the operations of 1410 may be performed by a DCI field manager as described with reference to FIGS. 5 through 8.

At 1415, the UE may receive the transmissions from the second UE according to the DCI. The operations of 1415 may be performed according to the methods described herein. In some examples, aspects of the operations of 1415 may be performed by a sidelink manager as described with reference to FIGS. 5 through 8.

At 1420, the UE may transmit, according to the DCI, a feedback message to the base station confirming receipt of the DCI, the transmissions from the second UE, or a combination thereof. The operations of 1420 may be performed according to the methods described herein. In some examples, aspects of the operations of 1420 may be performed by a feedback manager as described with reference to FIGS. 5 through 8.

Figure 15:
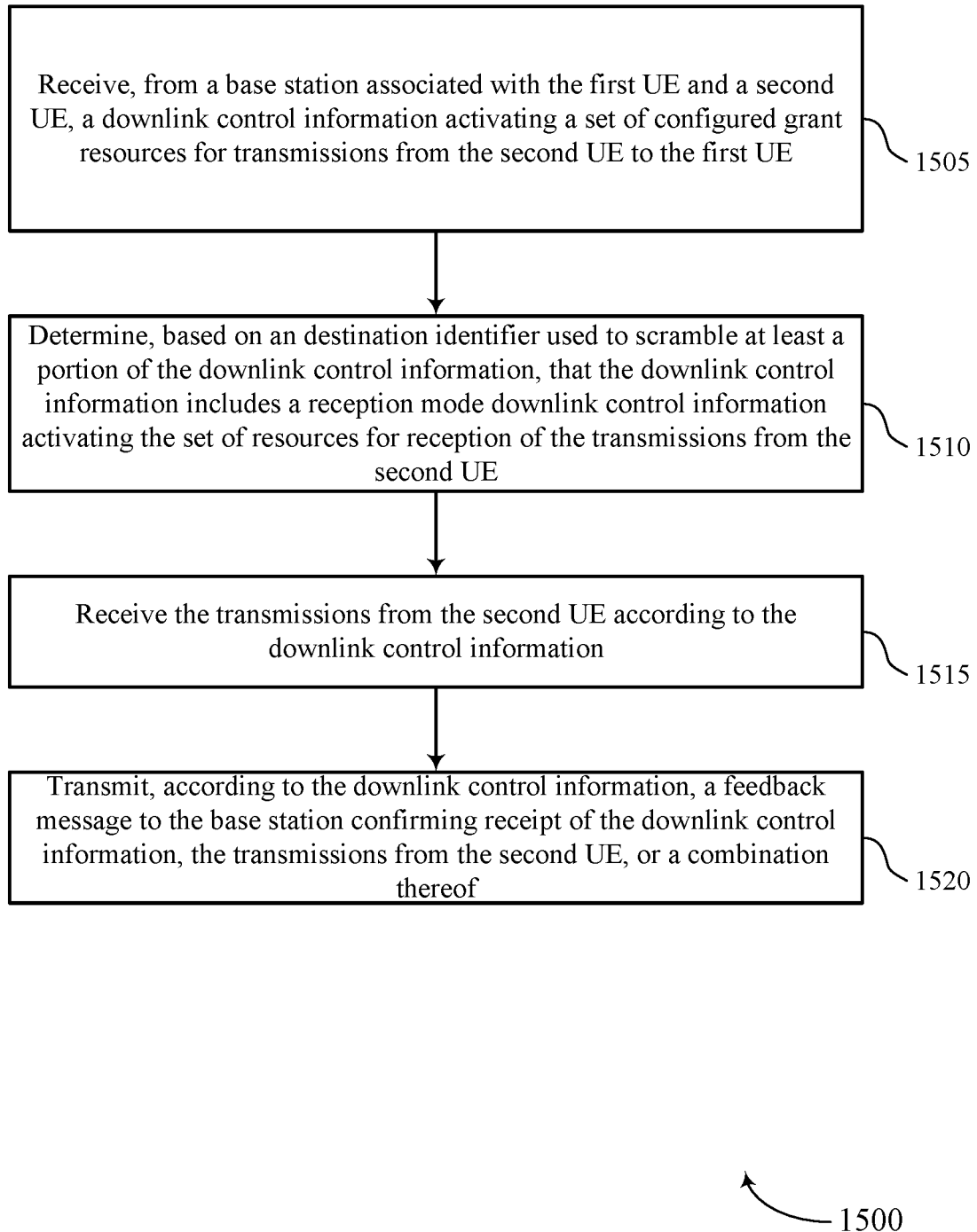

FIG. 15 shows a flowchart illustrating a method 1500 that supports delivering configured grants to sidelink receivers with confirmation in accordance with aspects of the present disclosure. The operations of method 1500 may be implemented by a UE 115 or its components as described herein. For example, the operations of method 1500 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1505, the UE may receive, from a base station associated with the first UE and a second UE, a DCI activating a set of configured grant resources for transmissions from the second UE to the first UE. The operations of 1505 may be performed according to the methods described herein. In some examples, aspects of the operations of 1505 may be performed by a grant manager as described with reference to FIGS. 5 through 8.

At 1510, the UE may determine, based on an destination identifier used to scramble at least a portion of the DCI, that the DCI includes a reception mode DCI activating the set of resources for reception of the transmissions from the second UE. The operations of 1510 may be performed according to the methods described herein. In some examples, aspects of the operations of 1510 may be performed by a DCI address manager as described with reference to FIGS. 5 through 8.

At 1515, the UE may receive the transmissions from the second UE according to the DCI. The operations of 1515 may be performed according to the methods described herein. In some examples, aspects of the operations of 1515 may be performed by a sidelink manager as described with reference to FIGS. 5 through 8.

At 1520, the UE may transmit, according to the DCI, a feedback message to the base station confirming receipt of the DCI. The operations of 1520 may be performed according to the methods described herein. In some examples, aspects of the operations of 1520 may be performed by a feedback manager as described with reference to FIGS. 5 through 8.

Figure 16:
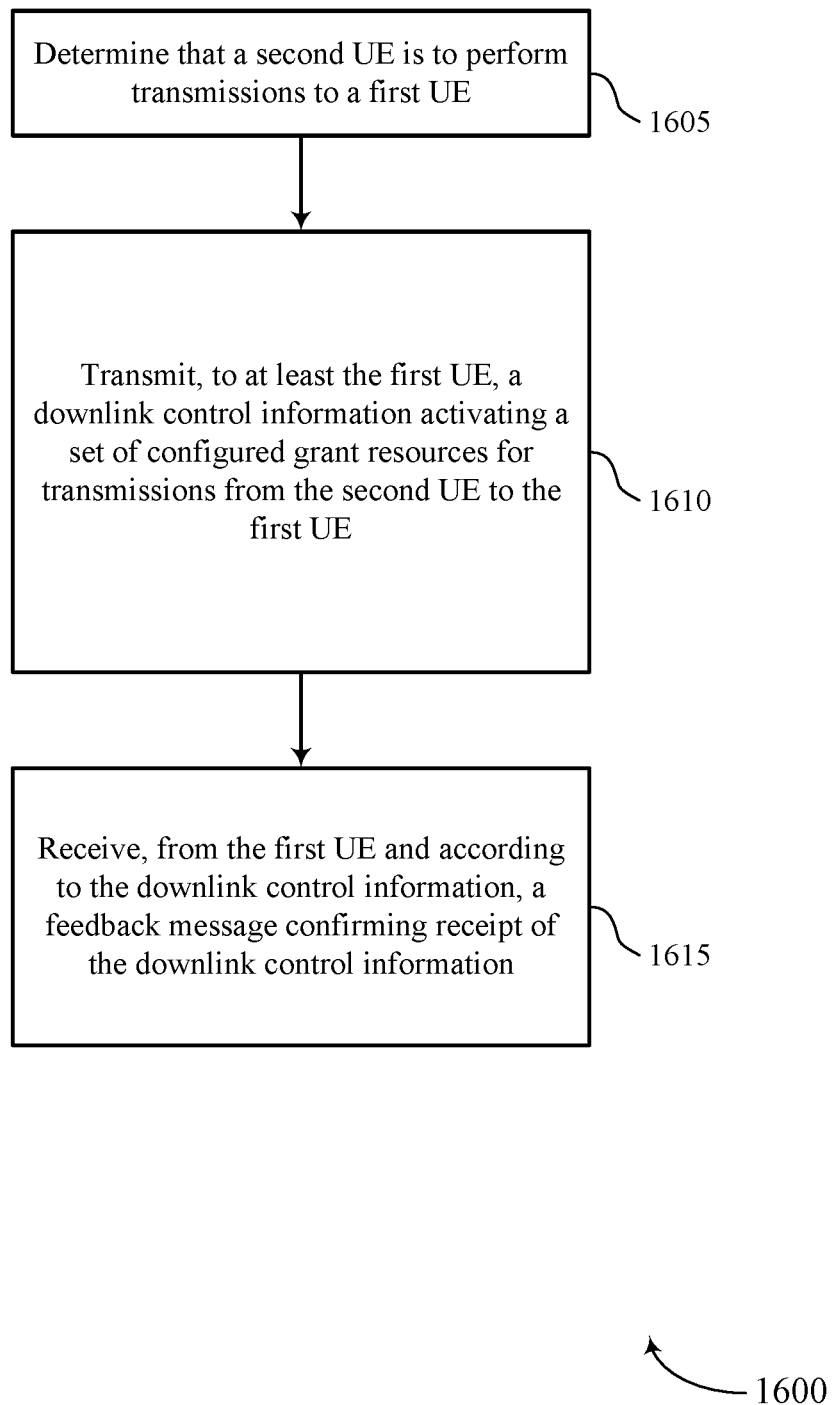

FIG. 16 shows a flowchart illustrating a method 1600 that supports delivering configured grants to sidelink receivers with confirmation in accordance with aspects of the present disclosure. The operations of method 1600 may be implemented by a base station 105 or its components as described herein. For example, the operations of method 1600 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1605, the base station may determine that a second UE is to perform transmissions to a first UE. The operations of 1605 may be performed according to the methods described herein. In some examples, aspects of the operations of 1605 may be performed by a sidelink manager as described with reference to FIGS. 9 through 12.

At 1610, the base station may transmit, to at least the first UE, a DCI activating a set of configured grant resources for transmissions from the second UE to the first UE. The operations of 1610 may be performed according to the methods described herein. In some examples, aspects of the operations of 1610 may be performed by a grant manager as described with reference to FIGS. 9 through 12.

At 1615, the base station may receive, from the first UE and according to the DCI, a feedback message confirming receipt of the DCI. The operations of 1615 may be performed according to the methods described herein. In some examples, aspects of the operations of 1615 may be performed by a feedback manager as described with reference to FIGS. 9 through 12.

Figure 17:
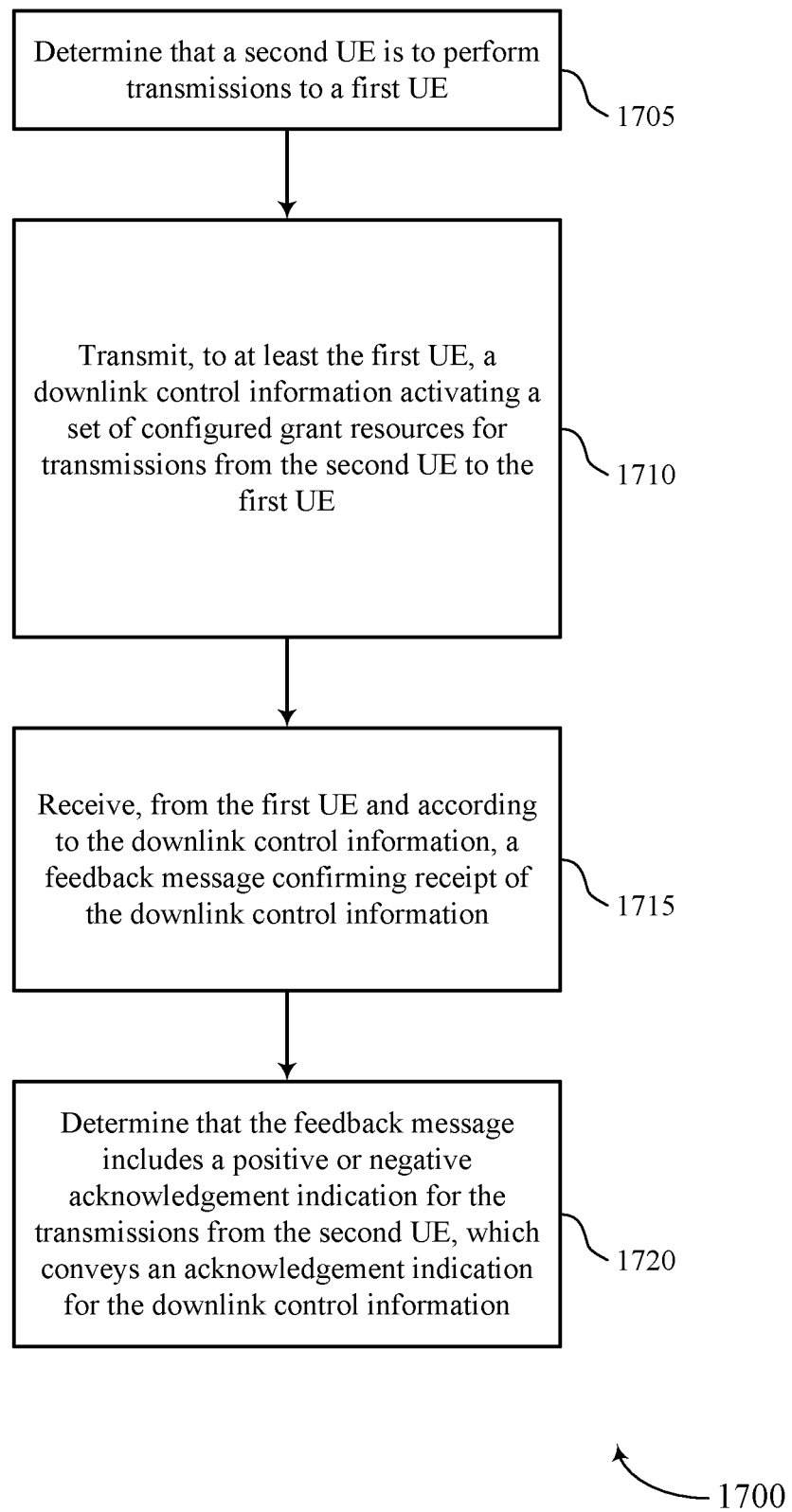

FIG. 17 shows a flowchart illustrating a method 1700 that supports delivering configured grants to sidelink receivers with confirmation in accordance with aspects of the present disclosure. The operations of method 1700 may be implemented by a base station 105 or its components as described herein. For example, the operations of method 1700 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1705, the base station may determine that a second UE is to perform transmissions to a first UE. The operations of 1705 may be performed according to the methods described herein. In some examples, aspects of the operations of 1705 may be performed by a sidelink manager as described with reference to FIGS. 9 through 12.

At 1710, the base station may transmit, to at least the first UE, a DCI activating a set of configured grant resources for transmissions from the second UE to the first UE. The operations of 1710 may be performed according to the methods described herein. In some examples, aspects of the operations of 1710 may be performed by a grant manager as described with reference to FIGS. 9 through 12.

At 1715, the base station may receive, from the first UE and according to the DCI, a feedback message confirming receipt of the DCI. The operations of 1715 may be performed according to the methods described herein. In some examples, aspects of the operations of 1715 may be performed by a feedback manager as described with reference to FIGS. 9 through 12.

At 1720, the base station may determine that the feedback message includes a positive or negative acknowledgement indication for the transmissions from the second UE, which conveys an acknowledgement indication for the DCI. The operations of 1720 may be performed according to the methods described herein. In some examples, aspects of the operations of 1720 may be performed by an acknowledgement indication manager as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

The following examples are given by way of illustration. Aspects of the following examples may be combined with aspects or embodiments shown or discussed in relation to the figures or elsewhere herein.

Example 1 is a method of wireless communication at a first UE that includes: receiving, from a base station associated with the first UE and a second UE, a downlink control information activating a set of configured grant resources for transmissions from the second UE to the first UE; and transmitting, according to the downlink control information, a feedback message to the base station confirming receipt of the downlink control information.

In example 2, the method of claim 1 may include determining, based at least in part on a field in the downlink control information, that the downlink control information comprises a reception mode downlink control information activating the set of resources for reception of the transmissions from the second UE.

In example 3, the method of any of examples 1-2 may include determining, based at least in part on an destination identifier used to scramble at least a portion of the downlink control information, that the downlink control information comprises a reception mode downlink control information activating the set of resources for reception of the transmissions from the second UE.

In example 4, the method of any of examples 1-3 may include determining, based at least in part on a format associated with the downlink control information, that the downlink control information comprises a reception mode downlink control information activating the set of resources for reception of the transmissions from the second UE.

In example 5, the method of any of examples 1-4 may include the format associated with the downlink control information indicating at least a time gap, a lowest index for a subchannel allocation for the transmissions, a frequency resource allocation, a time resource allocation, a configuration index, an uplink control channel resource indicator, or a combination thereof.

In example 6, the method of any of examples 1-5 may include identifying a first portion of a subheader of the feedback message associated with the first UE and a second portion of the subheader of the feedback message associated with the second UE; and configuring the first portion of the subheader of the feedback message to confirm receipt of the downlink control information, the transmissions from the second UE, or a combination thereof.

In example 7, the method of any of examples 1-6 may include receiving, from the base station, a configuration signal identifying the first portion and the second portion of the subheader.

In example 8, the method of any of examples 1-7 may include selecting a feedback message format associated with the downlink control information activating the set of resources for transmissions from the second UE to the first UE; and configuring the feedback message to confirm receipt of the downlink control information, the transmissions from the second UE, or a combination thereof, based at least in part on the feedback message.

In example 9, the method of any of examples 1-8 may include determining that the downlink control information from the base station was successfully decoded by the first UE; determining that the transmissions from the second UE were unable to be successfully decoded by the first UE; and configuring the feedback message with a positive or negative acknowledgement indication for the transmissions from the second UE, which conveys an acknowledgement indication for the downlink control information.

Example 10 is a method for wireless communication at a base station that includes: determining that a second user equipment (UE) is to perform transmissions to a first UE; transmitting, to at least the first UE, a downlink control information activating a set of configured grant resources for transmissions from the second UE to the first UE; and receiving, from the first UE and according to the downlink control information, a feedback message confirming receipt of the downlink control information.

In example 11, the method of example 10 may include configuring a field in the downlink control information to indicate that the downlink control information comprises a reception mode downlink control information activating the set of resources for reception of the transmissions from the second UE.

In example 12, the method of any of examples 10-11 may include selecting a destination identifier used to scramble at least a portion of the downlink control information to indicate that the downlink control information comprises a reception mode downlink control information activating the set of resources for reception of the transmissions from the second UE.

In example 13, the method of any of examples 10-12 may include selecting a format associated with the downlink control information to indicate that the downlink control information comprises a reception mode downlink control information activating the set of resources for reception of the transmissions from the second UE.

In example 14, the method of any of examples 10-13 may include the format associated with the downlink control information indicating at least a time gap, a lowest index for a subchannel allocation for the transmissions, a frequency resource allocation, a time resource allocation, a configuration index, an uplink control channel resource indicator, or a combination thereof.

In example 15, the method of any of examples 10-14 may include determining, based at least in part on a first portion of a subheader of the feedback message associated with the first UE and a second portion of the subheader of the feedback message associated with the second UE, that the first portion of the feedback message confirms receipt of the downlink control information, the transmissions from the second UE, or a combination thereof.

In example 16, the method of any of examples 10-15 may include receiving, from the base station, a configuration signal identifying the first portion and the second portion of the subheader.

In example 17, the method of any of examples 10-16 may include determining that the feedback message comprises a feedback message format associated with the downlink control information activating the set of resources for transmissions from the second UE to the first UE; and decoding the feedback message to confirm receipt of the downlink control information, the transmissions from the second UE, or a combination thereof, based at least in part on the feedback message format.

In example 18, the method of any of examples 10-17 may include determining that the feedback message comprises a positive or negative acknowledgement indication for the transmissions from the second UE, which conveys an acknowledgement indication for the downlink control information.

Example 19 is a system or apparatus including means for implementing a method or realizing an apparatus as in any of examples 1-18.

Example 20 is a non-transitory computer-readable medium storing instructions executable by one or more processors to cause the one or more processors to implement a method as in any of examples 1-18.

Example 21 is a system including one or more processors and memory in electronic communication with the one or more processors storing instructions executable by the one or more processors to cause the system or apparatus to implement a method as in any of examples 1-18.

Aspects of these examples may be combined with aspects or embodiments disclosed in other implementations Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communication at a first user equipment (UE), comprising:
    a processor,
    memory coupled with the processor; and
    instructions stored in the memory and executable by the processor to cause the apparatus to:
        receive, from a network device associated with the first UE and a second UE, a downlink control information activating a set of configured grant resources for transmissions from the second UE to the first UE; and
        transmit, according to the downlink control information, a feedback message to the network device confirming receipt of the downlink control information.

2. The apparatus of claim 1, wherein the downlink control information identifies a second feedback resource for a second feedback message associated with the transmissions from the second UE and the instructions are further executable by the processor to cause the apparatus to:
    receive the transmissions from the second UE according to the downlink control information; and
    transmit the second feedback message to the network device confirming receipt of the transmissions from the second UE.

3. The apparatus of claim 1, wherein the instructions are further executable by the processor to cause the apparatus to:
    determine, based at least in part on a field in the downlink control information, that the downlink control information comprises a reception mode downlink control information activating the set of configured grant resources for reception of the transmissions from the second UE.

4. The apparatus of claim 1, wherein the instructions are further executable by the processor to cause the apparatus to:
    determine, based at least in part on an destination identifier used to scramble at least a portion of the downlink control information, that the downlink control information comprises a reception mode downlink control information activating the set of configured grant resources for reception of the transmissions from the second UE.

5. The apparatus of claim 1, wherein the instructions are further executable by the processor to cause the apparatus to:
    determine, based at least in part on a format associated with the downlink control information, that the downlink control information comprises a reception mode downlink control information activating the set of configured grant resources for reception of the transmissions from the second UE.

6. The apparatus of claim 5, wherein the format associated with the downlink control information indicates at least a time gap, a lowest index for a subchannel allocation for the transmissions, a frequency resource allocation, a time resource allocation, a configuration index, an uplink control channel resource indicator, or a combination thereof.

7. The apparatus of claim 1, wherein the instructions are further executable by the processor to cause the apparatus to:
    identify a first portion of a subheader of the feedback message associated with the first UE and a second portion of the subheader of the feedback message associated with the second UE; and
    configure the first portion of the subheader of the feedback message to confirm receipt of the downlink control information, the transmissions from the second UE, or a combination thereof.

8. The apparatus of claim 7, wherein the instructions are further executable by the processor to cause the apparatus to:
    receive, from the network device, a configuration signal identifying the first portion and the second portion of the subheader.

9. The apparatus of claim 1, wherein the instructions are further executable by the processor to cause the apparatus to:
    select a feedback message format associated with the downlink control information activating the set of configured grant resources for transmissions from the second UE to the first UE; and configure the feedback message to confirm receipt of the downlink control information, the transmissions from the second UE, or a combination thereof, based at least in part on the feedback message.

10. The apparatus of claim 1, wherein the instructions are further executable by the processor to cause the apparatus to:
determine that the downlink control information from the network device was successfully decoded by the first UE;
determine that the transmissions from the second UE were unable to be successfully decoded by the first UE; and
configure the feedback message with a positive or negative acknowledgement indication for the transmissions from the second UE, which conveys an acknowledgement indication for the downlink control information.

11. An apparatus for wireless communication at a network device, comprising:
a processor,
memory coupled with the processor; and
instructions stored in the memory and executable by the processor to cause the apparatus to:
determine that a second user equipment (UE) is to perform transmissions to a first UE;
transmit, to at least the first UE, a downlink control information activating a set of configured grant resources for transmissions from the second UE to the first UE; and
receive, from the first UE and according to the downlink control information, a feedback message confirming receipt of the downlink control information.

12. The apparatus of claim 11, wherein the downlink control information identifies a second feedback resource for a second feedback message associated with the transmissions from the second UE and the instructions are further executable by the processor to cause the apparatus to:
receive, from the first UE and according to the downlink control information, the second feedback message confirming receipt of the transmissions from the second UE.

13. The apparatus of claim 11, wherein the instructions are further executable by the processor to cause the apparatus to:
configure a field in the downlink control information to indicate that the downlink control information comprises a reception mode downlink control information activating the set of configured grant resources for reception of the transmissions from the second UE.

14. The apparatus of claim 11, wherein the instructions are further executable by the processor to cause the apparatus to:
select a destination identifier used to scramble at least a portion of the downlink control information to indicate that the downlink control information comprises a reception mode downlink control information activating the set of configured grant resources for reception of the transmissions from the second UE.

15. The apparatus of claim 11, wherein the instructions are further executable by the processor to cause the apparatus to:
select a format associated with the downlink control information to indicate that the downlink control information comprises a reception mode downlink control information activating the set of configured grant resources for reception of the transmissions from the second UE.

16. The apparatus of claim 15, wherein the format associated with the downlink control information indicates at least a time gap, a lowest index for a subchannel allocation for the transmissions, a frequency resource allocation, a time resource allocation, a configuration index, an uplink control channel resource indicator, or a combination thereof.

17. The apparatus of claim 11, wherein the instructions are further executable by the processor to cause the apparatus to:
determine, based at least in part on a first portion of a subheader of the feedback message associated with the first UE and a second portion of the subheader of the feedback message associated with the second UE, that the first portion of the feedback message confirms receipt of the downlink control information, the transmissions from the second UE, or a combination thereof.

18. The apparatus of claim 17, wherein the instructions are further executable by the processor to cause the apparatus to:
receive, from the network device, a configuration signal identifying the first portion and the second portion of the subheader.

19. The apparatus of claim 11, wherein the instructions are further executable by the processor to cause the apparatus to:
determine that the feedback message comprises a feedback message format associated with the downlink control information activating the set of configured grant resources for transmissions from the second UE to the first UE; and
decode the feedback message to confirm receipt of the downlink control information, the transmissions from the second UE, or a combination thereof, based at least in part on the feedback message format.

20. The apparatus of claim 11, wherein the instructions are further executable by the processor to cause the apparatus to:
determine that the feedback message comprises a positive or negative acknowledgement indication for the transmissions from the second UE, which conveys an acknowledgement indication for the downlink control information.

21. A method for wireless communication at a first user equipment (UE), comprising:
receiving, from a network device associated with the first UE and a second UE, a downlink control information activating a set of configured grant resources for transmissions from the second UE to the first UE; and
transmitting, according to the downlink control information, a feedback message to the network device confirming receipt of the downlink control information.

22. The method of claim 21, wherein the downlink control information identifies a second feedback resource for a second feedback message associated with the transmissions from the second UE, further comprising:
receiving the transmissions from the second UE according to the downlink control information; and
transmitting the second feedback message to the network device confirming receipt of the transmissions from the second UE.

23. The method of claim 21, further comprising:
determining, based at least in part on a field in the downlink control information, that the downlink control information comprises a reception mode downlink control information activating the set of configured grant resources for reception of the transmissions from the second UE.

24. The method of claim 21, further comprising:
determining, based at least in part on an destination identifier used to scramble at least a portion of the downlink control information, that the downlink control information comprises a reception mode downlink control information activating the set of configured grant resources for reception of the transmissions from the second UE.

25. The method of claim 21, further comprising:
determining, based at least in part on a format associated with the downlink control information, that the downlink control information comprises a reception mode downlink control information activating the set of configured grant resources for reception of the transmissions from the second UE.

26. The method of claim 25, wherein the format associated with the downlink control information indicates at least a time gap, a lowest index for a subchannel allocation for the transmissions, a frequency resource allocation, a time resource allocation, a configuration index, an uplink control channel resource indicator, or a combination thereof.

27. The method of claim 21, further comprising:
identifying a first portion of a subheader of the feedback message associated with the first UE and a second portion of the subheader of the feedback message associated with the second UE; and
configuring the first portion of the subheader of the feedback message to confirm receipt of the downlink control information, the transmissions from the second UE, or a combination thereof.

28. The method of claim 27, further comprising:
receiving, from the network device, a configuration signal identifying the first portion and the second portion of the subheader.

29. A method for wireless communication at a network device, comprising:
determining that a second user equipment (UE) is to perform transmissions to a first UE;
transmitting, to at least the first UE, a downlink control information activating a set of configured grant resources for transmissions from the second UE to the first UE; and
receiving, from the first UE and according to the downlink control information, a feedback message confirming receipt of the downlink control information.

30. The method of claim 29, wherein the downlink control information identifies a second feedback resource for a second feedback message associated with the transmissions from the second UE, further comprising:
receiving, from the first UE and according to the downlink control information, the second feedback message confirming receipt of the transmissions from the second UE.

* * * * *